US008938161B2

(12) United States Patent
Webb et al.

(10) Patent No.: US 8,938,161 B2
(45) Date of Patent: Jan. 20, 2015

(54) METHOD AND SYSTEM FOR ENABLING POINTING CONTROL OF AN ACTIVELY STABILIZED CAMERA

(71) Applicant: Freefly Systems, Inc., Redmond, WA (US)

(72) Inventors: Steve Webb, Gravesend (GB); John Ellison, Ipswich (GB); Tabb Firchau, Redmond, WA (US); David Bloomfield, Redmond, WA (US)

(73) Assignee: Freefly Systems, Inc., Redmond, WA (US)

( * ) Notice: Subject to any disclaimer, the term of this patent is extended or adjusted under 35 U.S.C. 154(b) by 0 days.

(21) Appl. No.: 14/214,471

(22) Filed: Mar. 14, 2014

(65) Prior Publication Data
US 2014/0270743 A1   Sep. 18, 2014

Related U.S. Application Data

(60) Provisional application No. 61/792,878, filed on Mar. 15, 2013.

(51) Int. Cl.
*G03B 17/56* (2006.01)
*G02B 27/64* (2006.01)
(Continued)

(52) U.S. Cl.
CPC ............ *G02B 27/646* (2013.01); *H04N 5/2328* (2013.01); *H04N 5/23248* (2013.01); *B66F 11/048* (2013.01); *F16M 11/18* (2013.01); *H04N 5/23258* (2013.01)
USPC ............................................. 396/55; 396/421

(58) Field of Classification Search
CPC ......... G03B 15/006; G03B 5/00; G03B 17/56
USPC ............................................. 396/13, 55, 421
See application file for complete search history.

(56) References Cited

U.S. PATENT DOCUMENTS 3,638,502 A * 2/1972 Leavitt et al. ................ 74/5.34
4,033,541 A * 7/1977 Malueg ......................... 248/550
(Continued)

FOREIGN PATENT DOCUMENTS

DE    102012203834 B3   6/2013
GB       2036998 A       7/1980
(Continued)

OTHER PUBLICATIONS

International Search Report & Written Opinion for PCT Application No. PCT/EP2014/055221, Mailed Date: Jun. 13, 2014, Filed Date: Mar. 14, 2014.

*Primary Examiner* — W B Perkey
(74) *Attorney, Agent, or Firm* — Saliwanchik, Lloyd & Eisenschenk, P.A.

(57) ABSTRACT

A method for adjusting a pointing angle of an actively stabilized camera is provided. The camera is housed by an active stabilization system configured to stabilize the camera in accordance with a commanded pointing angle. The active stabilization system comprises a steering member rotatable around one or more of a pan axis, tilt axis, and roll axis of the system. The method comprises: deriving a joint angle measurement of the steering member associated with a rotational movement of the steering member and adjusting the pointing angle of the camera, based on the derived joint angle measurement, in a direction of the rotational movement of the steering member, if the joint angle measurement exceeds the threshold window. If the joint angle measurement is within the threshold window, the pointing angle of the camera is actively stabilized in accordance with the commanded pointing angle.

43 Claims, 19 Drawing Sheets

(51) Int. Cl.
*H04N 5/232* (2006.01)
*B66F 11/04* (2006.01)
*F16M 11/18* (2006.01)

(56) References Cited

U.S. PATENT DOCUMENTS

| | | | | |
|---|---|---|---|---|
| 4,752,791 | A * | 6/1988 | Allred | 396/13 |
| 4,989,466 | A * | 2/1991 | Goodman | 74/5.22 |
| 6,611,662 | B1 * | 8/2003 | Grober | 396/55 |
| 6,999,005 | B2 * | 2/2006 | Okada et al. | 340/967 |
| 2006/0025959 | A1 | 2/2006 | Gomez et al. | |
| 2006/0092508 | A1 | 5/2006 | Baun et al. | |
| 2009/0257741 | A1 * | 10/2009 | Greb et al. | 396/55 |
| 2011/0042459 | A1 | 2/2011 | Sullivan et al. | |
| 2011/0221900 | A1 | 9/2011 | Reich | |
| 2012/0263445 | A1 | 10/2012 | Beasley | |
| 2012/0316685 | A1 | 12/2012 | Pettersson | |

FOREIGN PATENT DOCUMENTS

| | | |
|---|---|---|
| GB | 2089522 A | 6/1982 |
| JP | 2006060459 A | 3/2006 |
| JP | 2007183356 A | 7/2007 |
| JP | 2007271392 A | 10/2007 |
| JP | 2010026271 A | 2/2010 |
| WO | 2006097102 A1 | 9/2006 |
| WO | 2012164296 A1 | 12/2012 |
| WO | 2013098288 A1 | 7/2013 |
| WO | 2013181669 A1 | 12/2013 |

* cited by examiner

METHOD AND SYSTEM FOR ENABLING POINTING CONTROL OF AN ACTIVELY STABILIZED CAMERA

CROSS-REFERENCE TO RELATED APPLICATION

This application claims the benefit of Provisional Patent Application No. 61/792,878, filed on Mar. 15, 2013, which is hereby incorporated by reference herein in its entirety.

FIELD OF THE TECHNOLOGY

The present disclosure relates to stabilization systems, and more particularly to an improved, lightweight, hand-held or vehicle-mounted camera stabilization system for use in photographic or video-related applications.

BACKGROUND

In many applications, it is desirable to stabilize a payload so that it is not affected by vibrations and unwanted movements. This is particularly important in film-production, where any unintentional shaking or movements introduced by, for example, a camera operator can result in footage that is uncomfortable to watch or framed incorrectly.

Passive stabilization mounts have been used to reduce shaking and smooth out movements by using mechanical systems such as springs, shock-absorbers and counterbalances. However, these systems can be large and cumbersome to operate, and typically require a great deal of experience to control effectively. Software-based digital stabilization, as well as optical stabilization exists, but they are typically restricted to correcting small movements.

One technology that is becoming increasingly prevalent is that of active stabilization. The currently available active stabilization systems use motors to counteract any movements detected by motion sensors. Optical gyroscopic sensors, which are sufficiently accurate to detect small vibrations, are typically used in such systems. However, the optical gyroscopic sensors tend to be large and very expensive.

Thus, it is desirable to provide a low-cost, lightweight stabilization system that can effectively remove unwanted movements, while also providing a level of control and flexibility to operators to easily and intuitively capture the footage they require.

SUMMARY

The described embodiments of the invention provide for a method and a system for enabling steering a pointing angle of a camera, actively stabilized by an active stabilization system, such as a gimbal, responsive to rotational movements of a steering member of the active stabilization system, such as a gimbal handle moved by a camera operator or a component of a gimbal frame, where the gimbal is attached to a moving object, such a vehicle, that causes the gimbal frame component to experience rotational movement.

In one embodiment, the present disclosure provides a method for adjusting a pointing angle of a camera housed by an active stabilization system configured to stabilize the camera in accordance with a commanded pointing angle, the system comprising a steering member, the steering member rotatable around one or more of a pan axis, tilt axis, and roll axis of the system, the method comprising: deriving a joint angle measurement of the steering member associated with a rotational movement of the steering member; and adjusting the pointing angle of the camera, based on the derived joint angle measurement, in a direction of the rotational movement of the steering member, if the joint angle measurement exceeds the threshold window.

In some example embodiments, the rotational movement is resolved around a vertical axis.

In some example embodiments, the method further comprises: actively stabilizing the pointing angle of the camera in accordance with the commanded pointing angle, if the joint angle measurement is within the threshold window.

In some example embodiments, the method further comprises: indicating, by the active stabilization system, a pointing angle locked state, if the joint angle measurement is within the threshold window.

In some example embodiments, the indicating step comprises one or more of visually indicating using a visual indicator of the active stabilization system and generating a sound indicator.

In some example embodiments, the method further comprises updating the joint angle measurement and deriving a control command for adjusting the pointing angle of the camera based on the updated joint angle measurement.

In some example embodiments, the step of updating the joint angle measurement comprises reducing the joint angle measurement by a threshold value of the threshold window, if the joint angle measurement exceeds the threshold window.

In some example embodiments, the step of updating the joint angle measurement comprises setting the joint angle measurement to zero, if the joint angle measurement is within the threshold window.

In some example embodiments, the method further comprises: applying a forcing function to the reduced joint angle measurement to derive an incremental update to the commanded pointing angle; updating the commanded pointing angle by the incremental update; and executing a stabilization control loop update based on the updated commanded angle to derive the control command for adjusting the pointing angle of the camera proportionally to the reduced joint angle measurement in the direction of the rotational movement of the steering member.

In some example embodiments, the method further comprises: executing an angle-based control loop to derive a commanded angle rate; and executing a stabilization control loop update based on the updated joint angle measurement and a zero commanded angle to derive the control command for adjusting the pointing angle.

In some example embodiments, the stabilization control loop update comprises: an angle-based outer control loop for deriving a commanded tilt rate; and a rate-based inner control loop update, based on the commanded rate and a current angle rate of the camera for deriving the control command for adjusting the pointing angle of the camera.

In some example embodiments, upon a pointing angle locked trigger becoming engaged, the method further comprises: measuring a current pointing angle of the camera; and storing the measured pointing angle of the camera as the commanded angle.

In some example embodiments, the method further comprises actively stabilizing the pointing angle of the camera in accordance with the stored commanded pointing angle until the pointing locked trigger becomes released.

In some example embodiments, the deriving a joint angle measurement step comprises: acquiring the joint angle measurement for one of the pan axis, the tilt axis, and the roll axis from a resolver of an actuator for the one of the pan axis, the tilt axis, and the roll axis.

In some example embodiments, the method is performed for one of the pan axis, the tilt axis, and the roll axis.

In some example embodiments, the method the method is performed for one of a pan axis, a tilt axis, and a roll axis; and the pointing angle of the camera is adjusted for the one axis.

In some example embodiments, the joint angle measurement is derived based on one of (1) a joint angle for an axis corresponding to the one of the pan, tilt, and roll axes, (2) a joint angle for an axis different from the one of the pan, tilt, and roll axes, and (3) two or more of joint angles for the pan, tilt, and roll axes, depending on one or more of a current pointing angle of the camera and a pointing angle of the system.

In some example embodiments, the method further comprises: stopping the adjusting of the pointing angle of the camera, if a new joint angle measurement falls below the threshold window.

In some example embodiments, the deriving a joint angle measurement step comprises: measuring a first angle by a first inertial measurement unit mounted on the camera; measuring a second angle by a second inertial measurement unit located at an intermediate location of a gimbal frame to derive a second measurement; and deriving the joint angle measurement based on the first and second angles.

In some example embodiments, the deriving a joint angle measurement step comprises: measuring a joint angle for two or more of the pan axis, the tilt axis, and the roll axis; and deriving the joint angle measurement based on the two or more measured joint angles.

In some example embodiments, a system is provided, the system comprising one or more processors, and memory comprising instructions which when executed by the one or more processors causes the system to carry out any of the methods described above.

In some example embodiments, a non-transitory computer-readable medium is provided, the medium storing program instructions for causing a processor to perform any of the methods described above.

In another embodiment, the present disclosure provides an active stabilization system for adjusting a pointing angle of a camera housed by the system, the system configured to stabilize the camera in accordance with a commanded pointing angle, the system comprising: a support member for supporting the camera, a steering member rotatable around one or more of a pan axis, tilt axis, and roll axis of the active stabilization system; an inertial measurement unit configured to measure a pointing angle and an angular rate of the camera, the inertial measurement unit mounted on the camera; and an active stabilization controller configured to execute any of the methods described above for one or more of a pan axis, a tilt axis, and a roll axis, using the measurements provided by the inertial measurement unit.

In some example embodiments, the system further comprises a second inertial measurement unit mounted on a frame of the system and configured to measure a pointing angle of the steering member, wherein the active stabilization controller is further configured to use the measurements provided by the camera mounted inertial measurement unit and the second inertial measurement unit, when executing a method according to any of any of the methods described above.

In some example embodiments, the active stabilization system further comprises an indicator for indicating when the pointing angle of the camera is locked.

In some example embodiments, the system is further configured to allow a camera operator to enable execution of a method according to any of any of the methods described above for selected one or more of the pan axis, the tilt axis, and the roll axis.

BRIEF DESCRIPTION OF DRAWINGS

Examples of the present proposed approach will now be described in detail with reference to the accompanying drawings, in which.

DETAILED DESCRIPTION

Figure 1:
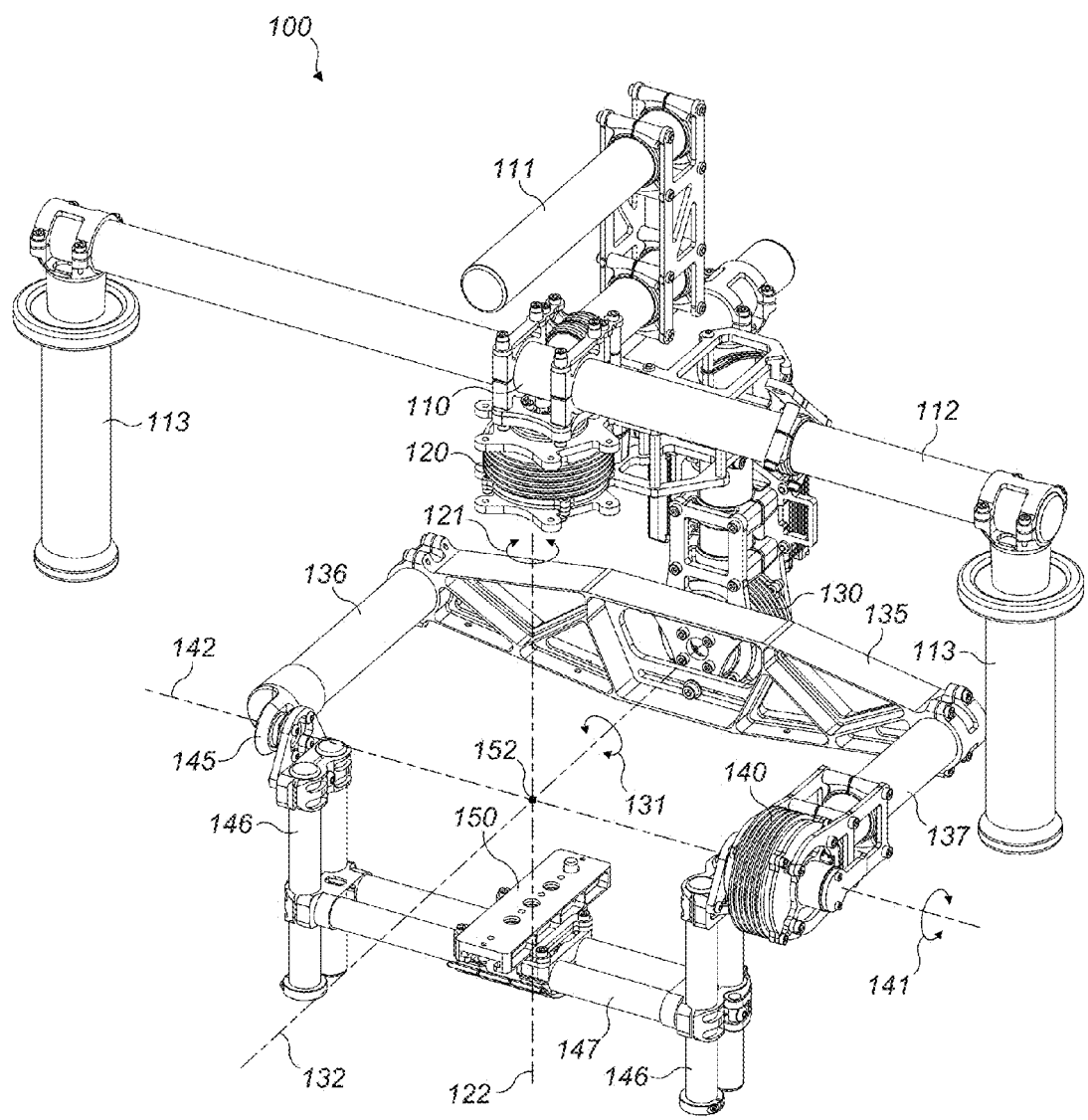
FIG. 1 shows a perspective view of a 3-axis stabilization system for carrying out stabilization techniques in accordance with the present disclosure, according to some embodiments.

FIG. 1 shows a 3-axis camera stabilization system 100, also referred to as a gimbal, according to some embodiments of the present invention. The system 100 includes a support base 110 to which a support frame 112 is attached for manual support and manipulation by an operator. Two handles 113 are attached to the support frame 112 on either side of the support base 110 to allow for two-handed operation of the gimbal 100 and full control over movement of the gimbal 100. A secondary frame 111 is attached to the support base 110 and may be used to attach the overall system 100 to a vehicle or other support or mount. The secondary frame 111 may also be used as a handle for single-handed operation by the operator. Further, peripheral devices may be attached to the secondary frame 111.

The illustrated system 100 is equipped with three motors, a pan axis motor 120, a tilt axis motor 140 and a roll axis motor 130. These motors can provide a rotational input in either direction around the pan 122, tilt 142, and roll 132 axes of the assembly as shown by arrows 121, 131, and 141, respectively. The three motors 120, 130, and 140, when working together, allow a full range of movement of a payload within the gimbal 100. In particular, the pan axis motor 120 is fixed (attached, or otherwise permanently secured, or is removable) to the support base 110 and configured (constructed, designed, or the like) to rotate a structure housing the roll axis motor 120. The roll axis motor 120 is in turn configured to rotate a structure housing the tilt axis motor 140, which is configured to rotate a payload (not shown).

In the illustrated system 100, the roll axis motor 130 rotates a roll beam 135, to which horizontal members 136 and 137 are attached. The tilt axis motor 140 is attached to one horizontal member 137, and its opposing pivot 145 is attached to the other horizontal member 136. The tilt axis motor 140 and the opposing pivot 145 rotate down-tubes 146 along with the cross member 147 attached to the down-tube 146, thereby rotating the payload attached to the cross member 147.

The payload will typically be a camera mounted to the system by a camera mounting arrangement 150. The camera mounting arrangement 150 is generally in the form of a plate, "shoe," or the like, which defines one or more protrusions for engaging with a corresponding recess on a mounting part of the camera. However, various coupling, engaging, and/or fixing means may be provided for securing the camera to the mounting arrangement 150, including but not limited to screw threads, clips, slide and lock mechanisms, and/or the like (not shown).

A point of intersection 152 of the three orthogonal axes 122, 132, and 142 preferably remains generally fixed regardless of the rotation of any of the three motors 120, 130, and 140. In order for a camera mounted in the stabilization system 100 to achieve "passive stability", the center of gravity (COG) of the camera, which varies for different camera designs, should be located at or as near as possible to point 152 where the three orthogonal axes 122, 132, and 142 intersect.

By positioning the camera COG at the intersection point 152, rotational moments applied to the camera by lateral acceleration disturbances of the system are reduced, or even eliminated. Furthermore, the inertia of the payload itself tends to cause the payload to maintain a pointing direction, notwithstanding frictional forces at the axes of rotation. By incorporating these or some other forms of passive stabilization into the arrangement of the system 100, the power draw of active stabilization is kept minimal, particularly when not in motion.

Adjustment means are provided within the stabilization system 100 in order to adjust the COG of a camera mounted to the mounting arrangement 150. For example, in FIG. 1, the mounting arrangement 150 is configured to enable repositioning of a mounted camera relative to each of the orthogonal axes. Centering the COG of the camera, mounted to the mounting arrangement 150, relative to an axis will render the camera "balanced" with respect to that axis. In other words, the camera COG will be at a neutral point relative to that axis, preferably located on the axis, or on a horizontal or vertical plane of the axis. Centering the COG of the camera along each of the orthogonal axes will provide for a balanced camera.

FIG. 1 depicts only an example of a gimbal structure suitable for performing the stabilization techniques described in the present disclosure. The support structures and actuators and their arrangement vary between different embodiments and may change depending on, for example, intended use of the gimbal assembly. For example, the support structures arrangement may be altered to prevent possible obstruction of the payload's view in certain direction(s), adapted to accommodate larger or smaller payloads, and the like.

Figure 2:
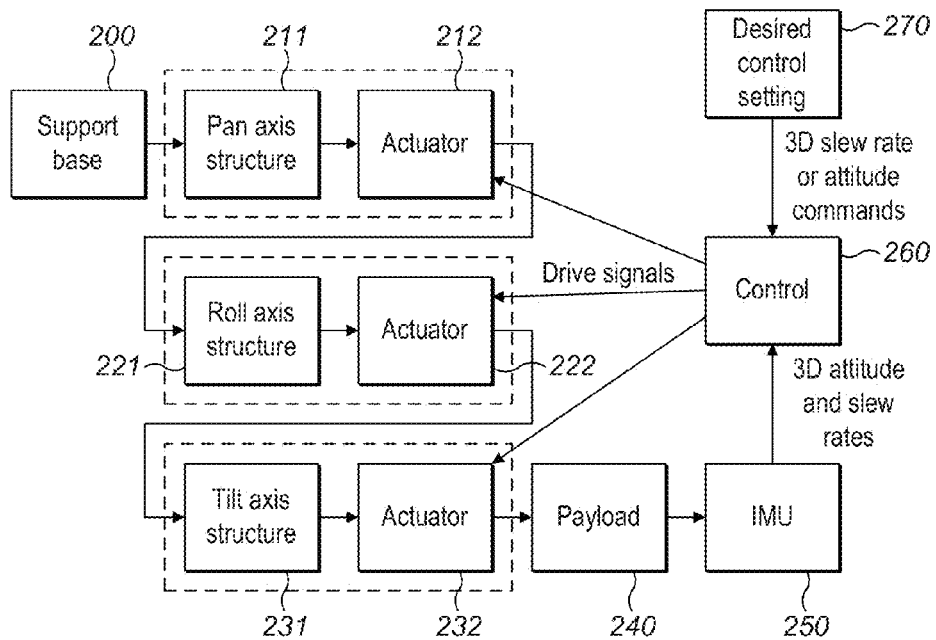
FIG. 2 is a flowchart showing the linkage of top-level elements of a 3-axis stabilization system, according to some embodiments.

FIG. 2 is a flow chart showing how the top level elements of a 3-axis gimbal structure are linked together, according to some embodiments. A support base 200 supports the rest of the gimbal structure and may be mounted to a vehicle, a fixed structure, or held by a camera operator. The support base 200 enables the entire gimbal structure to be moved to different locations during filming, while allowing the other components of the gimbal structure to rotate independently of the moving support base 200. Such an arrangement is particularly useful when camera is being moved while filming a scene.

In the exemplary embodiment of the gimbal structure of FIG. 2, the support base 200 is connected to a pan axis structure 211, which houses a pan axis actuator 212 for rotating the rest of the gimbal structure about a pan axis. Rotations about the pan axis ('panning') are rotations about a vertical axis and within a horizontal plane. In the systems disclosed herein, pan rotations are described relative to the gimbal structure.

The pan axis actuator 212 is connected to a roll axis structure 221 enabling pan rotations of the roll axis structure 221. The roll axis structure 221 houses a roll axis actuator 222 for rotating the rest of the gimbal structure about a roll axis. Rotations about the roll axis ('rolling') are rotations about an axis pointing forward relative to the gimbal structure, and are typically used for rotating the horizon.

The roll axis actuator 222 is connected to a tilt axis structure 231, enabling roll rotations of the tilt axis structure 231. The tilt axis structure 231 may house a tilt axis actuator 232 for rotating the rest of the gimbal structure about a tilt axis. Rotations about a tilt axis ('tilting') are rotations about an axis running horizontally across (left to right) of the gimbal structure, thus allowing rotations up and down relative to the gimbal structure.

The actuators 212, 222, and 232 and the supporting structures 211, 221, and 231 are connected in series to connect to a payload 240. Therefore, rotations by each of these actuators result in a corresponding rotation of the payload 240, thereby allowing full control of the payload's 240 rotations within the gimbal structure. The payload 240 is the object to be stabilized and typically is a camera.

The actuators 212, 222, and 232 are typically motors, but may be any other actuator capable of imparting rotational motion. The actuators could also be linear actuators coupled to cranks, or other mechanisms, for translating linear motion in to rotational motion. The range of rotations of the actuators within the system is preferably, but not necessarily, 360° about each respective axis. If restricted, the range of rotation may be restricted along some or all axes. Further, the range of motion may be limited by physical restrictions of the actuator and/or the surrounding support structure, for example.

The order in which the supporting structures and actuators are linked is not restricted to the order illustrated in FIG. 2 and may vary depending on, for example, an intended use or configuration of the gimbal. In FIG. 1, for example, the pan axis motor 120 is attached to the support base 110, thereby allowing the payload to pan a full 360° range, without the gimbal structure obstructing the view of the payload. However, tilting the payload substantially upward in this configuration may cause the structure to obstruct the view if the payload. Therefore, in the illustrated system 100, pan movements are prioritized over other tilt and roll movements. However, by linking the tilt axis motor to the support base before the pan axis motor instead allows a full range of unobstructed tilt motion.

Furthermore, the specific order of the actuator and axis structure may be rearranged to alleviate complications in wiring and connections. For example, if the support base 210 only comprises a handle, the pan axis actuator 212 could be mounted in the same structure 221 as the roll axis actuator 222, allowing for common wiring of the pan and roll axes actuators to be interlinked and be shorter.

An IMU (inertial measurement unit) 250 is attached to the payload 240 to monitor the motion and pointing direction of the payload 240. The IMU determines the angular position, also referred to herein as the attitude, of the payload. The attitude measurement consists of pitch (tilt), roll and yaw (pan) with respect to a reference frame, which is normally aligned to the Earth's surface. Alternatively, the attitude measurements may be made relative to the support base 200, or an arbitrary reference location and/or direction, for example on a filming set. The measurement of motion, or 'slew,' consists of measuring the rate of change of pitch, roll and yaw in the same axes. The present disclosure sometimes refers to these rates of change as a pitch (tilt) rate, a roll rate, and a yaw (pan) rate.

A control element (controller) 260 processes the attitude and motion measured by the IMU 250 to provide output drive signals in order to operate/actuate the actuators 212, 222, and 232 in closed loop feedback. The control element receives a target (desired) camera orientation from an external source 270. The external source 270 collects data concerning camera operator's intentions and either processes that data to derive the desired camera orientation, e.g., a pointing angle or slew rate, or provides the data to the control element 260 to derive the same. In a single-operator mode, the operator may indicate his or her intentions by manipulating the gimbal handles or using a thumb joystick or other controller on the gimbal. In a dual-operator mode, a remote operator may express his or her intentions using a remote controller that is in communication with the gimbal, e.g., via a radio link.

External disturbances on the pointing angle and/or required motion are compensated by the control loop applying correctional control signals to the actuators. These signals may be acceleration, braking, or reversal of motion by the actuators. The signals may represent a torque command such that a constant value would achieve a constant acceleration of the payload 240 acting against the physical moment of inertia. It is desirable, though not required, for the controller to achieve optimal control without overshoot or delay, while also giving the best speed response (highest control bandwidth). It is preferable for the actuators to be strong and the gimbal structure to be stiff to avoid resonances or flexure within the control bandwidth.

In some embodiments, the gimbal is simplified to fewer than 3 controllable axes. For example, a 2-axis gimbal may be used on a VTOL UAV (vertical take-off and landing unmanned aerial vehicle) as the 3rd pan axis would naturally be provided by the controlled rotation of the airframe.

Figure 3:
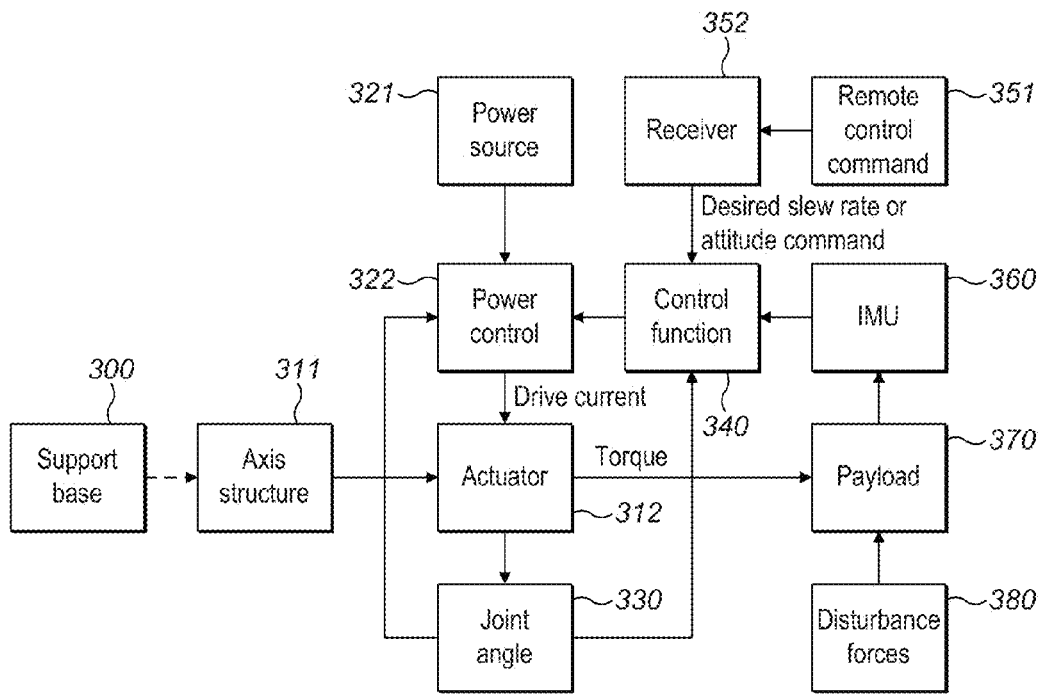
FIG. 3 is a flowchart showing the control elements for a single axis of a stabilization system, according to some embodiments.

FIG. 3 provides a detailed overview of a control system for a single axis. The motion with respect to the other axes in the gimbal is controlled by the same control system of FIG. 3 or a similar control system.

In FIG. 3, a support base 300 is connected either directly to the axis structure 311 or through intermediate elements, such as other axis structures. The axis structure 311 houses an actuator 312, which is coupled to a payload 370 to rotate it about an axis. The coupling of the actuator 312 to the payload 370 may be a direct coupling, such as a shaft, or via intermediate element(s) that are connected directly to the payload 370. The actuator 312 is capable of supplying a rotational torque to be applied to the payload 370 to cause an angular acceleration of the payload 370 dependent on its moment of inertia about the axis.

The control system of FIG. 3 further comprises an element 330 for measuring the joint angle between the actuator and its output shaft. By providing joint angle measurements, the element 330 allows the control system to determine the actual angle between the actuator and the payload to account for frictional torque forces, for example. What particular device(s) form the element 330 varies between different embodiments and includes, but is not limited to, resistive potentiometers, optical shutter wheel encoders, a magnetic Hall resolver, and/or a toothed wheel with a variable reluctance sensor.

In addition the torque forces applied to the payload 370 by the actuator 312, the payload 370 may also experience disturbance forces 380 about the same axis. Such disturbance forces may, for example, arise from friction of the actuator shaft when the support base 300 is rotated. If the payload 370 is not balanced about the axis, the disturbance forces 380 may also arise when the support base 300 is subject to lateral acceleration.

As shown in FIG. 3, the IMU 360 determines the attitude and motion of the payload 370 and outputs respective measurements to a control function 340. The combination of the payload mounted IMU 360 and control function 340 provides means for canceling any disturbance forces 380 and achieving a desired motion and/or constant set attitude with no unwanted disturbances.

In addition to the actual attitude and motion data of the payload 370, the control function 340 also receives a desired motion or pointing command, for example, supplied by a receiver 352, wirelessly communicating with a remote teleoperator via a remote control device 351. The remote operator may slew the gimbal and monitor feedback on a remote image monitor for a filming or sighting application. This allows a dual-operator mode in which one operator carries the gimbal for translational movement and the other operator, i.e., a remote operator, controls the pointing angle of the camera.

Alternatively, or in addition, both the desired motion and pointing command may be instigated by the operator carrying the gimbal using a handles based joystick or rotary knobs, such as a tilt thumbwheel control. In some embodiments, the control system of FIG. 3 uses the relative joint angle measurement 330 to command a slew by monitoring the support base motion. It is also possible for the slew and/or pointing commands to come from an artificial source such as a targeting computer, or a remote IMU that is mounted on another structure such as a monopod, tripod, a person, a vehicle, or the like.

The output of the control function 340 is amplified by a power control block which converts the current from a power source 321 (such as a rechargeable battery) into a form that is compatible with the actuator 312. The power control 322 is preferably regenerative and able to provide braking of the actuator 312 and to recover energy from a moving payload 370, thereby improving efficiency of the power control 322. For example, if a rotational motion is present in one direction and a reversal is required, then the actuator and the power control extract the rotational energy stored in the payload and replenish the power source. In some embodiments, the actuator 312 is accelerated and decelerated with equal capacity and is fully reversible.

Figure 4:
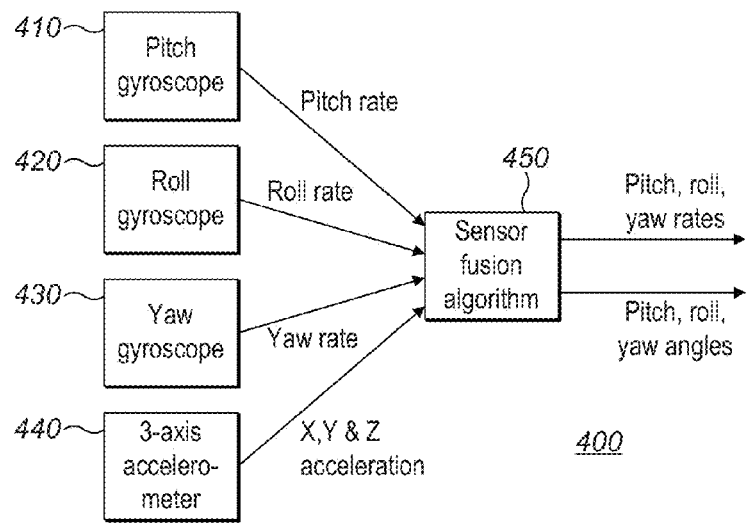
FIG. 4 is a flowchart showing the elements of a basic inertial measurement unit (IMU), according to some embodiments.

FIG. 4 illustrates elements of a basic IMU 400 for determining attitude and motion, according to some embodiments. The simple version of the basic IMU 400 provides only motion as an output, but no attitude measurements (data). Such a device includes gyroscopes 410, 420, and 430, whose outputs vary according to motion (slew) about their respective orthogonal axes, but no 3-axis accelerometer 440. For resolving the output of the gyroscopes at zero motion an algorithm is employed that averages over a long timescale and assumes short term disturbances, but substantially no movement, over the long timescale. This algorithm forms a high pass filter for subtracting the DC offset that would otherwise be observed at zero motion. The DC offset may change over time, for example, due to differences in the device temperature and ageing.

Optical gyroscopes experience very little drift with zero motion over long timescales. However, they are generally expensive and heavy, and thus may not always be suitable for hand held portable stabilization devices. As an alternative to optical gyroscopes, low cost MEM (micro-electro-mechanical) devices could be used as IMU sensors. MEM devices are fully integrated and contain all management circuitry to run the electronics providing a simple digital or analogue interface. Multiple axes may be detected by a single component, allowing for very compact sensors and IMUs, and thus enabling optimal placement on the payload. However, such low cost MEM devices may encounter drift over time due to differences in temperature and ageing. They also typically have a higher noise (random walk) than the larger, more expensive designs, such as optical gyroscopes.

To include the lower cost/size sensors into the IMU 400 and assure accuracy of the IMU 400, the drift of the lower cost/size sensors needs to be compensated for and updated frequently. For this purpose, in some embodiments, the IMU 400 includes a 3-axis accelerometer 440, which derives pitch and roll attitudes by measuring acceleration with respect to gravity. These attitude measurements are then used to correct the drift of the gyroscopes 410, 420 and 430. In particular, if the accelerometer-derived pitch and roll attitudes are constant, then it is inferred that the respective gyroscopes should be registering the zero rate.

Further, by integrating the angular motion determined from the gyroscopes, the attitude may also be derived from the gyroscopes. More specifically, changes in attitude require an increase and then decrease in angular rate for a move from a starting point to a finishing point. By integrating the curve of the angular rate (usually numerically) a rotation angle can be derived. Integration methods, such as trapezoidal, Runge-Kutta, and Simpsons, may be employed and are used given a required accuracy and/or available processing resources. The integration is performed periodically, at some interval, to commensurate with the overall control loop, for example, at 400-500 Hz. The orientation angle derived by the gyroscope integration is compared to the angle directly resolved by the 3-axis accelerometer which is references to the Earth's gravity. Periodic corrections are applied to minimize the difference between the two measurements.

As a calibrated accelerometer tends to provide more accurate readings over long timescales than drifting gyroscopes, the accelerometer readings are used to correct the gyroscopes' bias and scale. The bias is set as the error in the zero motion case and is used as a constant rotational offset (inferring motion that wasn't happening). The scale is set as the error in the magnitude of gyroscope derived deflection. Thus, it is possible to construct a sensor fusion algorithm 450, for example based on a Kalman filter and Quaternion angle representation, to derive accurate and compensated readings for motion (angular rate) and pointing direction (attitude). Generally speaking, the sensor fusion algorithm 450 takes the high bandwidth readings from the gyroscopes 410, 420, and 430 and calibrates them to increase their accuracy using the lower bandwidth readings from the accelerometer 440. The two types of sensors are complementary and sometimes their combination is done by what is referred to as a complimentary filter. A number of different structures/combinations of the sensors are possible.

As described herein, the IMU 400 is generally capable of deriving sufficiently reliable measurements of motion and attitude through the combination of different types of sensors to provide for a controlled solution. However, although by combining the sensors some of the inaccuracy effects of using cheaper, smaller sensors, are mitigated, further accuracy issues may be introduced during more complex movements. For example, if the gimbal is carried by a moving vehicle turning a corner, the described IMU 400 may mistake the radial acceleration for gravitational acceleration, thereby incorrectly assessing the motion of the payload by introducing a roll motion to the payload. Such incorrect introduction of the roll motion to the payload is undesirable particularly because deviations of the horizon from the horizontal line are easily noticeable in cinematography.

Figure 5:
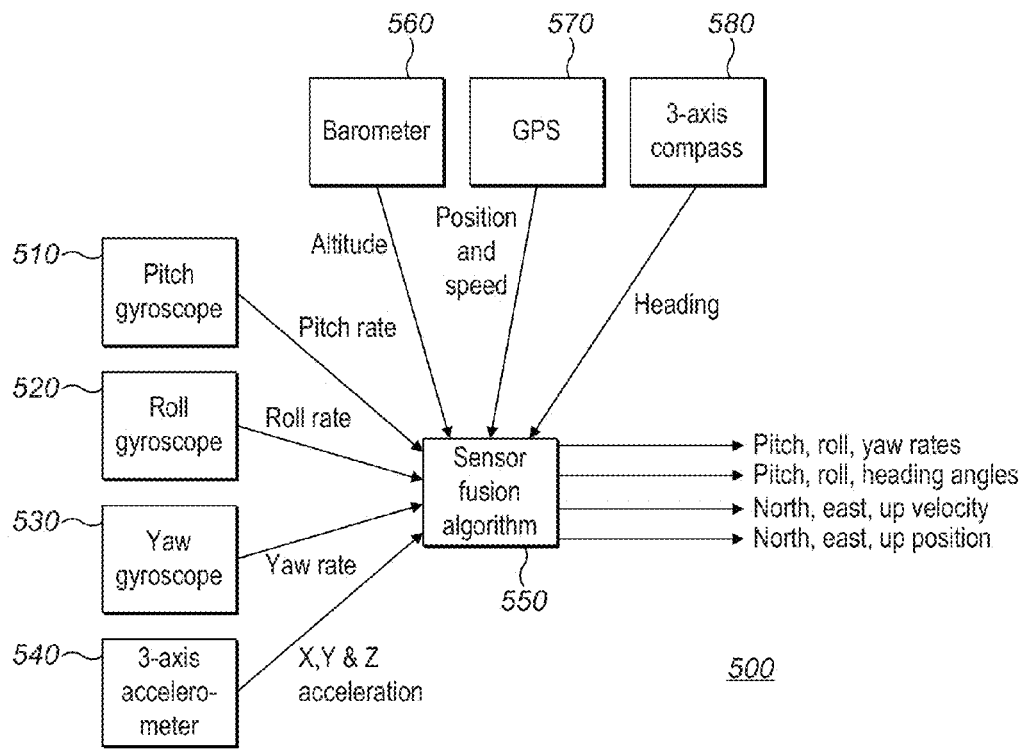
FIG. 5 is flowchart showing the elements of an enhanced IMU, according to some embodiments.

FIG. 5 shows an enhanced IMU 500, in accordance with some embodiments. Similar to the IMU 400, the IMU 500 includes gyroscopes 510, 520, and 530, whose outputs vary according to motion (slew) about their respective orthogonal axes, and 3-axis accelerometer 540. However, unlike the IMU 400, the IMU 500 also includes additional sensors to improve the IMU's performance during lateral or radial acceleration. These additional sensors may include a 3-axis compass 580 and a GPS system 570, which can be used to derive real heading, position and velocity of the gimbal. The real heading is obtained by comparing the gravitational vector with the known Earth magnetic vector. By resolving these vectors, a heading vector is obtained and then used to correct drift of the yaw-axis gyroscope 530. The heading vector provides the IMU 500 a fixed reference for comparing data obtained by the gyroscope. The IMU 400 does not have such a reference and relies on a long term averaging method to deduce a gyroscope offset bias. Further, the GPS derived velocities for East and North direction are resolved together with the heading vector to obtain an acceleration value that is used to correct erroneous measurements and/or gravitational acceleration for a radially moving gimbal base, thereby fixing the horizon drift issue.

More specifically, acceleration readings from the accelerometer 540 are integrated to derive velocity, which is then compared and corrected via the GPS derived velocity using another Kalman filter structure. These velocities may be further integrated and compared with yet another Kalman filter to the GPS position. The net result is a high bandwidth measurement of the position and velocity derived using integration of acceleration and correction with a slower set of readings from GPS. These high bandwidth readings are useful to allow higher order gimbal functions such as automatic correction of the camera's pointing angle. The accelerometer readings are corrected by the above-described process to remove the zero bias drift, similarly to the gyroscope, and enable deriving of an accurate gravity reference vector, uninfluenced by radial acceleration.

In some embodiments, the IMU 500 also includes a barometer sensor 560, which enables the IMU 500 to derive additional height change (altitude) information. In particular, the barometer-based height change information tends to be more accurate than the GPS-based height information. The barometers can resolve heights with accuracy of about 5 cm. The GPS sensors, however, typically resolve heights with accuracy of only 2.5 m CEP (circular error probable), because GPS signals are subject to environmental and reflection interference phenomena, in addition to constantly changing satellite constellations. Although the GPS sensors can provide a long term accurate data, they drift over short time frames, such as periods of seconds. In the IMU 500, the measurements derived by the barometer sensor 560 are then fused with the measurements derived by the accelerometer 540 using a Kalman filter in the manner similar to the GPS data, as described above. The derived GPS data may also be fused with the barometer data to provide for longer term corrections, for example, if there are local air pressure changes due to wind or weather.

Figure 6:
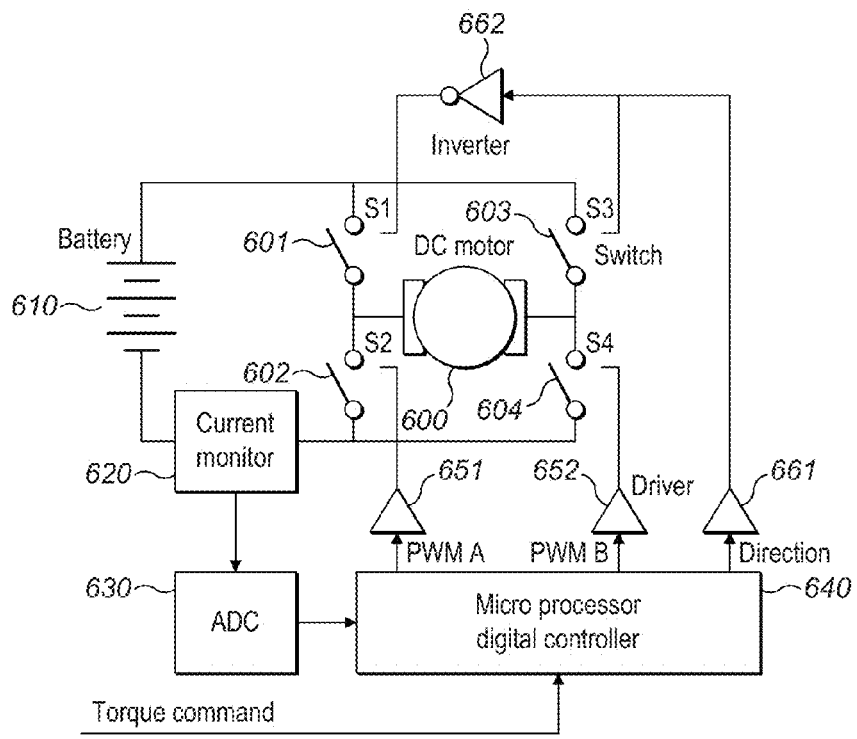
FIG. 6 is a schematic for a power control for a direct current (DC) motor, according to some embodiments.

As discussed above with respect to FIG. 2, in some embodiments, the actuators for rotating the payload are DC motors. FIG. 6 illustrates an example of a power control system for controlling a DC motor 600, according to some embodiments. A bridge containing four switches—switch S1 601, switch S2 602, switch S3 603, and switch S4 604—are arranged to provide reversible current to the motor 600 from a power source, such as a battery 610. In some embodiments, these switches are transistors, such as BJTs (bipolar junction transistors) or more commonly NMOSFETs (N-type metal-oxide-semiconductor field-effect transistors). In the arrangement of FIG. 6, if the switches S1 601 and S4 604 are closed, the motor 600 will run in a forward direction, while if switches S3 603 and S2 602 are closed, the motor 600 will run in a backward direction. If the motor 600 is in a state of motion, such as running forward, reversing the switches to trigger the backward rotation would effectively apply regenerative braking back into the power source via the dynamo effect, until physical reversal occurs.

In some embodiments, to achieve control characteristics with a minimal damped overshoot and fastest response time, the current is regulated through the motor. In particular, by modulating the duty cycle of any one switch in conjunction with the other switch for the required direction, a pulsed averaging may be achieved in combination with self-inductance of the motor, thereby reducing the applied voltage and current in a smooth way. For example, implementing a duty cycle of 50% would half the battery voltage that is needed to be applied to the motor 600. In some embodiments, the PWM frequency is set to a rate, which does not impart high switching losses and approximates a smooth current depending on the motor inductance. Further, by setting the frequency above the audible range, magneto-construction noises, otherwise polluting the soundtrack, may be reduced or removed.

Generating the gate drive for a NMOSFETs switch is typically easier on the low side power rail. Thus, in some embodiments, the bottom switches S2 602 and S4 604 are switched using pulse-width modulation ('PWM'). While the top switches S1 601 and S3 603 select a direction for the motor 600, in conjunction with the PWM switches S2 602 and S4 604, an inverter 662 ensures that only one direction is logically selected by the switches S1 601 and S3 603. A microprocessor 640 generates the PWM pulses, regulating them to achieve a desired drive current and direction. The current may be monitored via a current monitor 620, such as a shunt resistor paired with a hall device, and then fed into the microprocessor 640 using an analogue-to-digital convertor (ADC) 630.

In some embodiments, the motor 600 is designed to operate in a stalled condition and capable of sustained torque, without overheating or burning out. This may be achieved by winding the motor 600 with a sufficiently large number of turns such that the resistance is increased to a point where the full supply voltage can be applied across the motor 600 with an acceptable current. This would be the maximum torque condition, and it allows for a large number of turns which amplify the magnetic effect at a lower current.

It is preferable to match the motor 600 to the supply voltage such that a 0 to 100% duty cycle on the PWM equates to the full torque range. This will provide for inductive smoothing of the PWM signal due to the higher inductance that comes with a larger number of wire turns. At the same time, since the motion of a motor within a stabilization system is typically short (usually less than one second), a large back electromagnetic field (EMF) from the high turn motor winding is unlikely to cause a noticeably detrimental effect.

In some embodiments, the PWM switches are operated in a complementary manor. For example, if the switch S3 603 is energized for the motion in one direction, then the switches S1 601 and S2 602 are switched complementary to each other with PWM such that when the switch S1 601 is on, the switch S2 602 is off, while when the switch S1 601 is off, the switch S2 602 is on. Although this configuration requires additional PWM outputs from the microprocessor, it also provides for improved efficiency, for example, through active fly-wheeling, rather than using the body diode of the N-FET switch (which would otherwise cause a larger drop in voltage). In this configuration, when the complementary N-FET switch is turned on (during the active flywheel period), this would introduce a low resistance and, for typical currents, the voltage dropped would likely be less than 0.1V.

To provide for a quieter, or even silent, and smooth drive and/or to eliminate magneto-constriction noises polluting the filming soundtrack, the PWM is generally set to operate at higher frequencies. For example, in some embodiments, the PWM frequency is set outside the typical audible frequency range, e.g., higher than 20 kHz.

Figure 7:
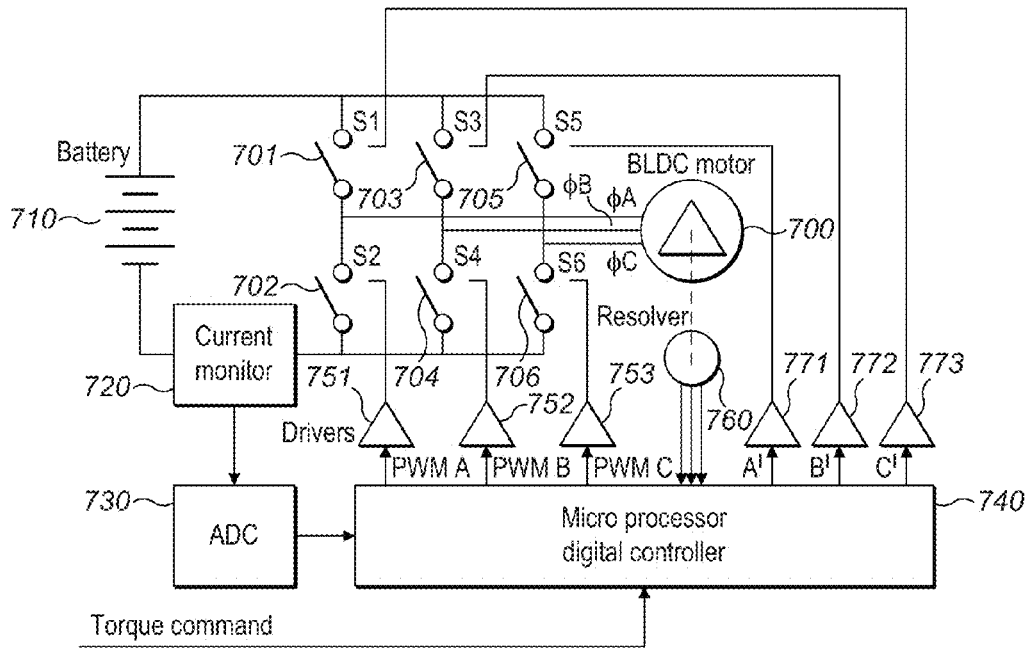
FIG. 7 is a schematic for an enhanced power control for a brushless DC motor, according to some embodiments.

In some embodiments, the actuator is a 3-phase BLDC motor (brushless DC) motor. Such a motor is generally more efficient, capable of achieving higher torque than a 2-phase motor, and is not limited by heating of commutator brushes as with a basic DC motor. FIG. 7 illustrates an example power control system for controlling a 3-phase BLDC motor 700.

A three-phase bridge is provided by six switches S1 701, S2 702, S3 703, S4 704, S5 705, and S6 706. The motor 700 is commutated by observing a resolver 760 that provides angular feedback of a position. The energization of the coils in the motor 700 is arranged to achieve forward or reverse motion using a 6-step commutation sequence with the switch pairs, in conjunction with the resolver 760. The resolver 760 may be an optical, resistive, or hall based device and may have 3 outputs to achieve a resolving code.

The remaining components of the power control system of FIG. 7 operate similarly to the components of the power control system of FIG. 6, described above. In particular, a battery 710 supplies power to the six switches 701 to 706. The current is monitored by a current monitor 720 and fed into a microprocessor 740 using an analogue-to-digital convertor (ADC) 730. Outputs A' 771, B' 772, and C' 773 of the microprocessor 740 are connected to the top switches S1 701, S3 703, and S5 705, while bottom switches S2 702, S4 704, and S6 706 are fed PWM signals from the microprocessor 740.

It should be noted that the motors 600 and 700 and the power control systems for controlling them of FIGS. 6 and 7 respectively are described for illustrative purposes only. Other types of motors and power control systems could be used, depending on the physical and/or commercial requirements. For example, the motor may be constructed as an out-runner to achieve greater torque for a given diameter by nature of magnet geometry, or the motor may be a pancake with exotica magnet arrays based on Halbach array methods to achieve even greater torque levels for a given size. A further example of a motor suitable for implementing embodiments described herein is a conventional induction machine.

Figure 8:
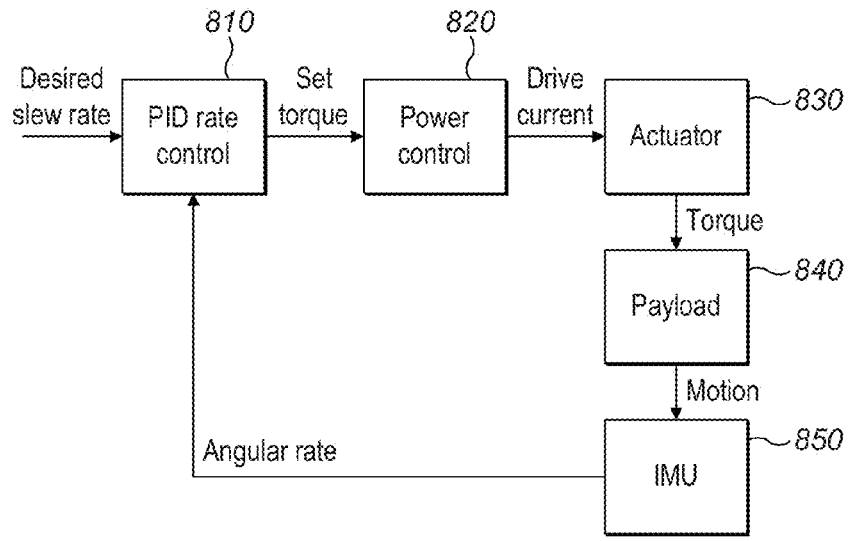
FIG. 8 is a flowchart illustrating an attitude control loop, according to some embodiments.

FIG. 8 illustrates a simple feedback loop for achieving closed loop control. An IMU 850 determines a motion, such as an angular rate, of a payload 840. At a PID (proportional-integral-derivative) rate control element 810, the measured angular rate of the payload 840 is compared with a desired slew (motion) rate provided as an input, to output a 'set-torque' command to a power control element 820. The power control element 820 provides a drive current to an actuator 830, which applies a torque to the payload 840 causing it to accelerate in the desired direction, which is again measured by the IMU 850. As a result, the loop is in closed feedback. Motion that does not equate to the desired slew rate will be amplified as an error and a compensating control signal will be provided to the power control element 820, and the actuator 830.

The control loop for FIG. 8 relies on detecting changes in motion, rather than changes in angle. Therefore, if there is a disturbance that causes the attitude to be jolted to a new position, the control loop of FIG. 8 may not be able to correct for the respective change in position.

Further, during a slow motion control, friction and stiction may interfere with the motion, causing a non-constant rate of movement. This may be undesirable, particularly during filming with a long focal length lens where control is needed to be subtle. Moreover, when using cheaper, smaller MEM sensors, the output of the sensors may be subject to random walk and noise in the determined rate, which may visibly impact their performance with unreliable drift.

Figure 9:
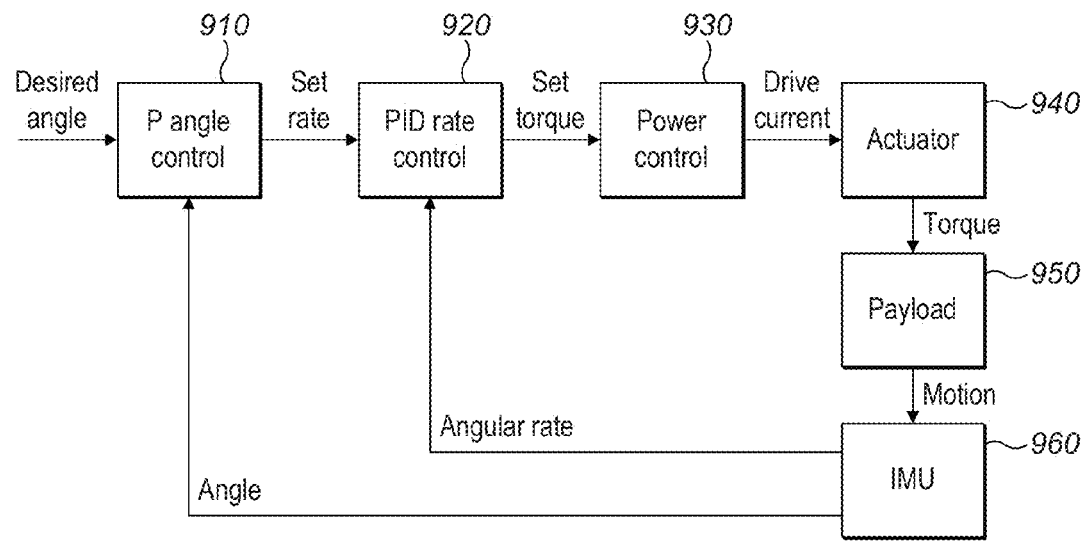
FIG. 9 is a flowchart illustrating an enhanced attitude control loop, according to some embodiments.

FIG. 9 shows an enhanced control loop that includes an angle control loop for addressing some of the problems indicated above. Similarly to the control loop of FIG. 8, in FIG. 9, a PID rate control element 920 receives, as input, a desired motion rate, as well as a detected angular rate of a payload 950 from an IMU 960. The PID rate control element 920 then sets a torque value as an input to a power control element 930, which subsequently sets the required drive current for an actuator 940 to achieve the torque value. However, unlike the attitude control loop of FIG. 8, in the control loop of FIG. 9, in addition to considering motion, desired (commanded) and detected (measured, derived) angles of the payload 950 are also considered. More specifically, a P (proportional) angle control element 910 receives, as input, a desired angle for the payload 950, as well as a detected angle of the payload 950 as determined by the IMU 960. The P angle control element 910 then sets a rate for the motion that would result in the desired angle. The proportional loop senses an error between the desired and measured angles and aims to keep this error to a minimum. In this manner, errors due to friction, stiction, and random walk are effectively cancelled out by means of the absolute attitude being the main control variable.

Figure 10:
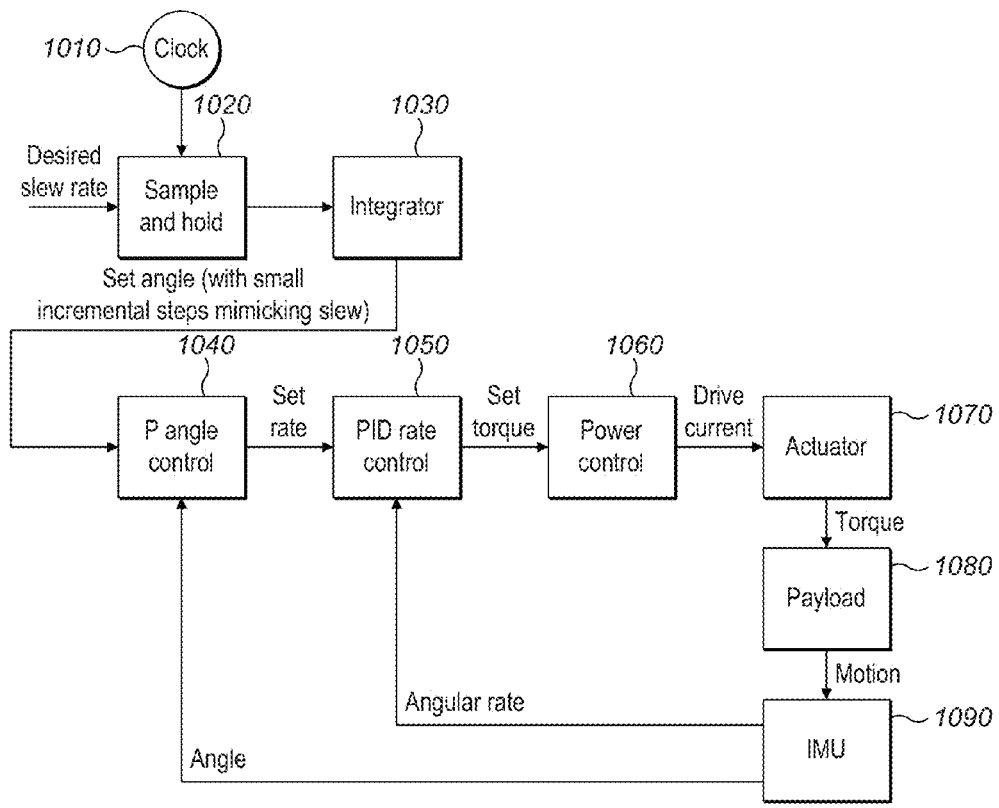
FIG. 10 is a flowchart illustrating an attitude control loop with an input mechanism, according to some embodiments.

Typical joysticks for controlling the direction of a camera determine a slew rate based on the joysticks' position. As the control loop of FIG. 9 takes an angle as input, rather than a desired slew rate, the slew rate output of a joystick should be converted to preferred angles. FIG. 10 illustrates how the control loop of FIG. 9 could be adapted to take a slew-based input. A desired slew rate from a control input, such as a joystick, is sampled at a sample and hold element 1020 at a frequent interval. This frequent interval is determined, for example, by a clock 1010. In some embodiments, the frequent interval is set between 400 Hz and 500 Hz. However, this range is exemplary only, and the frequent interval may be below 400 Hz or above 500 Hz.

The sampled slew rate is then integrated at an integrator 1030, using a constant period, which outputs a constant change in pointing angle. The change in this pointing angle mimics slew but is actually a number of sequentially different pointing commands that are closely related. These changing pointing angles are sent to a P angle control 1040, which also receives the detected angle of a payload 1080 as determined by an IMU 1090. The P angle control 1040 sets a rate for the motion that would result in the desired angle. It then sends the required rate of movement to a PID rate control 1050 unit, which also receives a detected angular rate of the payload 1080 from the IMU 1090. The PID rate control 1050 sets a torque value as an input to a power control 1060, which subsequently sets the required drive current for an actuator 1070 to achieve the torque value.

Figure 11:
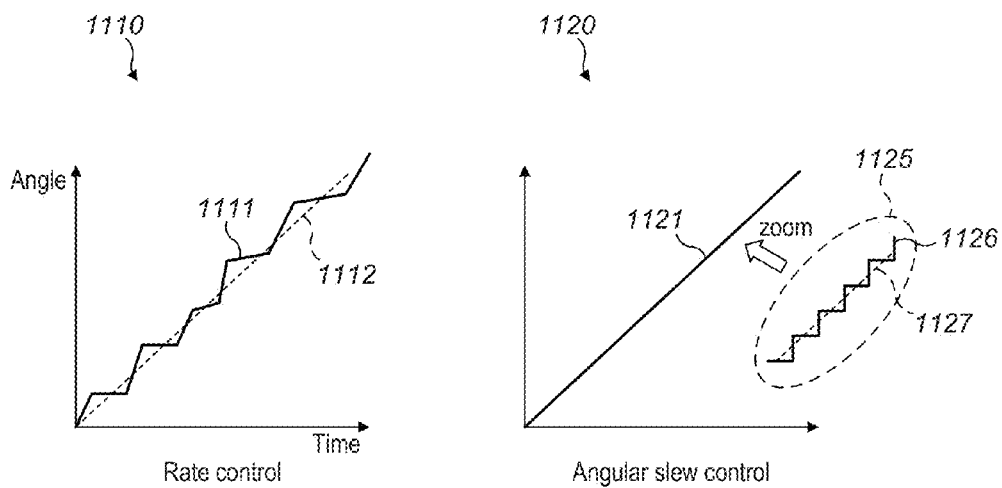
FIG. 11 shows a comparison of stabilization performance between two methods of controlling the stabilization system, according to some embodiments.

FIG. 11 illustrates the differences in performance of the rate control system illustrated in FIG. 8 and the angular slew control system illustrated in FIG. 10. Graph 1110 shows variations in angle over time for a rate control system where mechanical stiction and sensor random walk results in deviations of the resultant slew 1111 from the desired, smooth slew 1112. Graph 1120 shows the variations in angle over time for an angular slew control system. The actual motion 112, as shown, is much smoother than the corresponding motion 1111 of the graph 1110. This is because the attitude (or angle) loop automatically compensates for erratic errors and leaves only the minor ripple associated with the small steps, as shown in the magnified portion 1125 where the actual motion 1126 deviates from the desired motion 1127 by small steps. For example, to slew at 10°/s at 500 Hz requires steps of only 0.02° per step, resulting in the appearance of very smooth movement.

Figure 12:
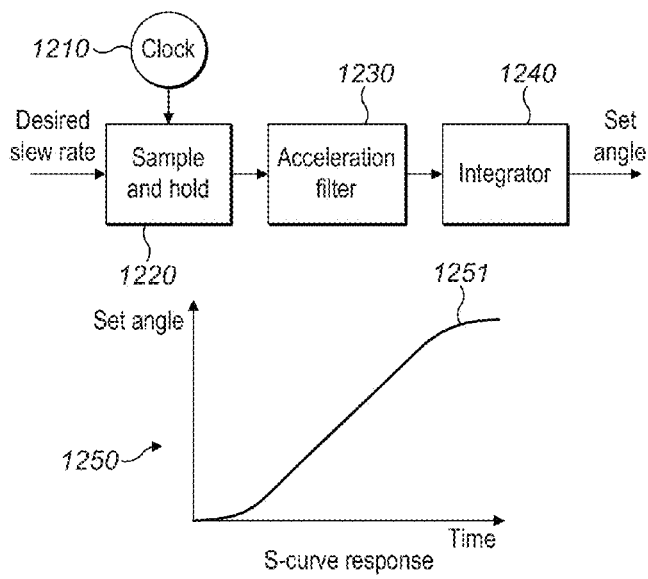
FIG. 12 illustrates an acceleration filter for modifying input commands, according to some embodiments.

In some embodiments, the input command, such as an operator command provided via a joystick, may be modified or filtered to result in a desired control effect. For example, the operator may wish to reduce the jerkiness of the input signal, and to have a gradual start of motion, followed by a period of constant motion, and then a gradual stop of motion. Such an effect may be difficult to achieve manually. FIG. 12 shows how to improve or alter the input received at the control loop by introducing a filter into the loop.

In particular, as in FIG. 10, in FIG. 12, a sample and hold element 1220 samples a desired slew rate at a frequency determined by a clock 1210. However, unlike FIG. 10, where the sampled rate is inputted directly into an integrator, in FIG. 12, the sampled rate is inputted into an acceleration filter 1230 for filtering, and only the filtered signal is then integrated at an integrator 1240, which sets the angle for the rest of the control loop. Graph 1250 shows a possible response curve 1251, illustrating how an input slew rate can be filtered to produce a more desirable, smoother result.

In some embodiments, the filter 1230 is based on a symmetrical non-causal least squares filter (similar to a Wiener filter), which has length, and thus memory or periodic samples. Each new sampled rate is introduced into the filter, which acts as a shift buffer. The filter 1230 uses a straight line fit and takes values at the mid-point of that line fit. When the buffer is full of similar samples, the fit will be the desired (commanded) input value. For example, if the buffer is full of 20 zeros, and a new sample of 10°/s value is introduced, then the slope of the least square fit will be shallow and give a mid-point underestimate of the required value. If the buffer, however, is full of 20 samples, each having a value of 10°/s, then the slope will be flat and give a projected mid-point of 10°/s as commanded. If the buffer is intermediately full of similar samples, the slope of the fit may be positive or negative and changes in a way of acceleration or deceleration—the commanded output versus the commanded input. The filter 230 may use a mixture of historical samples, which were not commanding a motion, and the more recent samples, which were commanding a motion. Once the filter 1230 is flushed with constant input values, the output is also constant and unchanging. If motion is commanded to stop, then the filter gradually flushes through to give zero at the output. The smoothing of the filter has a desired characteristic, which may be tailored by altering the length of the filter. Other, more numerically efficient filters such as Savitzky-Golay, or FIR based, may also be employed as the filter 1230.

Figure 13:
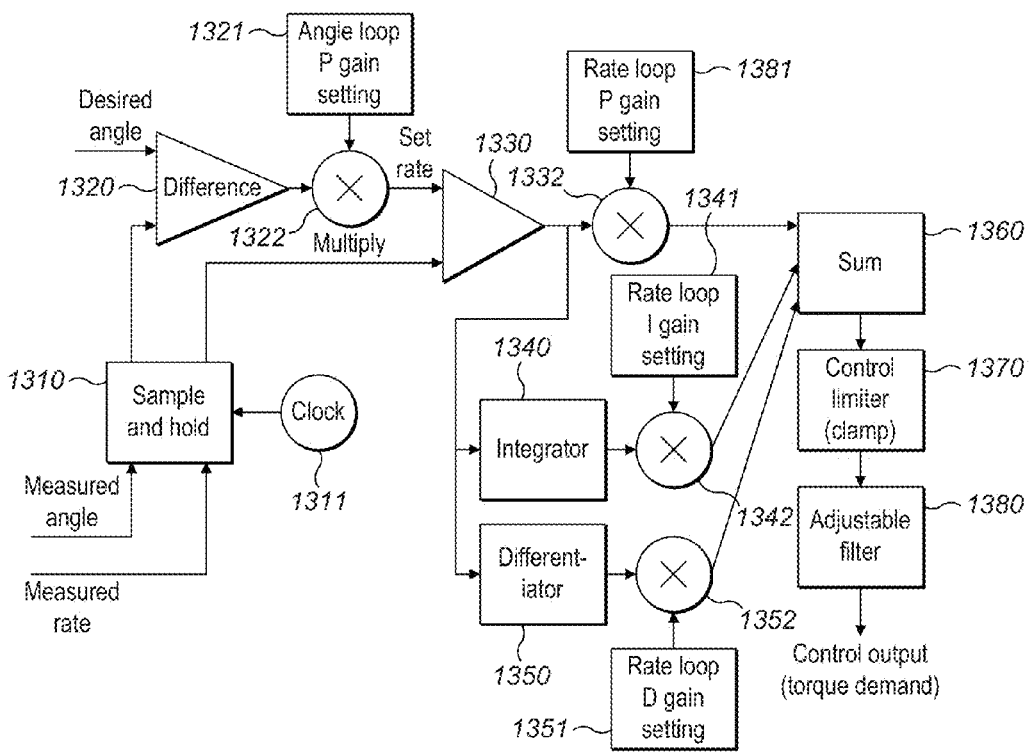
FIG. 13 is a detailed flowchart of the elements in a control loop for stabilizing a stabilization system, according to some embodiments.

FIG. 13 illustrates a more detailed diagram of a digital PID control loop, according to some embodiments. Measured IMU angular rate and angle are sampled and held at 1310 at a control loop tick rate determined by a clock 1311. In some embodiments, the control loop tick rate is in sympathy with the drive updates to the actuator. The difference between the measured angle and the desired set angle is calculated at 1320, and the resulting error is multiplied at 1322 by an angle loop P (proportional) gain 1321 to generate a command set rate for an inner loop.

The command set rate from the multiplier 1322 is subtracted at 1330 from the measured IMU angular rate 1310 and the resulting error is multiplied at 1332 by an inner P rate loop gain 1331. The same error is also integrated at 1340 and differentiated at 1350 at each clock update, where the output of the integrator 1340 is multiplied at 1342 by an integral (I) gain setting (constant) 1341, while the output of the differentiator 1350 is multiplied at 1352 by a differential (D) gain constant 1351. The results of these three multiplications 1332, 1342, and 1352 are summed at an aggregator 1360, forming a PID loop for the inner rate control.

In some embodiments, the output of the aggregator 1360 is clipped at the control limiter 1370 to reduce potential problems with saturation (such as demanding too much torque). The output may also be fed through an optional filter 1380, which is a digital low pass or notch filter based on FIR (finite impulse response) and IIR (infinite impulse response) techniques. The filter 1380 is generally configured to alleviate issues associated with structural resonance, which might otherwise disturb the control loop response. For example, the filter 1380 may be configured such as to cut off prior to a control instability point or notch out a hi-Q peak at some frequency which could cause mechanical resonance. In some embodiments, a rate limiter (not shown) is included into the outer control loop to limit the slew rates—the command set rate from the multiplier 1322. The output of the aggregator 1360 eventually reaches a control output to power an actuator and cause movement.

In some embodiments, the gain settings 1321, 1331, 1342, and 1352 of the PID loop are adjustable. In this manner, a desired control response with minimal overshoot and rapid response, without instability, may be achieved and/or adjusted. The P gain sets the overall loop gain to reduce disturbance errors. The I gain sets the accuracy for small errors on longer time scales, thereby effectively setting a time constant. With the I gain, finite errors may be cancelled out, with absoluteness. The D gain sets some predicted output, particularly helping with fast motion, and is generally used to improve the speed response. In some embodiments, the control loop is based only on the two P loops. However, in some other embodiments, the I and D gains are introduced for better performance.

Figure 14:
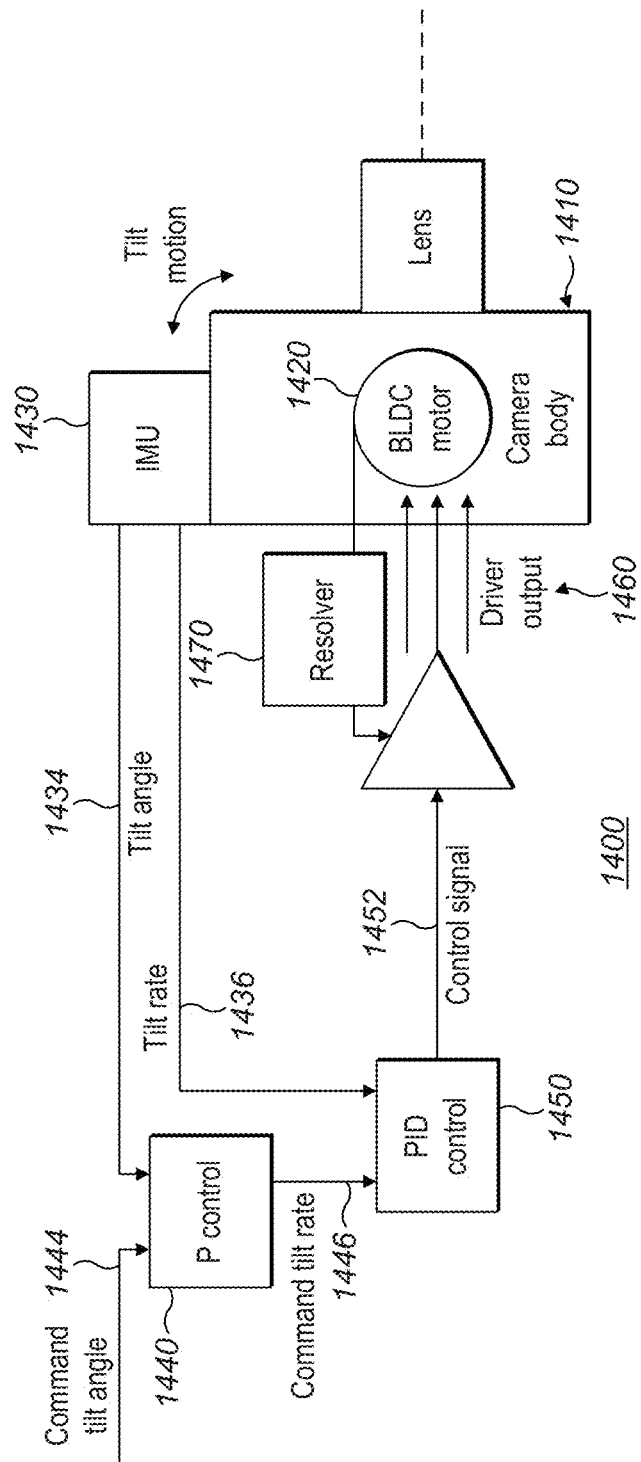
FIG. 14 is a flowchart of a single axis stabilization controller for controlling a pointing angle of a camera, according to some embodiments.

FIG. 14 illustrates a single axis stabilization control process 1400 for controlling a tilt angle of a payload, e.g., a camera 1410, housed by an active stabilization system (gimbal). The process 1400 controls the tilt angle of the camera 1410 using a brushless DC motor 1420, determining required adjustments based on measurements obtained by an IMU 1430. The IMU 1430 is mounted on the body of the camera 1410 or otherwise co-located with the camera 1410 (e.g., on a camera head) so as to be able to sense (measure, determine, provide, derive, or the like) position and velocity of the camera 1410. As discussed in more detail with respect to FIG. 9, such an IMU comprises a GPS, a 3-axis accelerometer, a 3-axis gyroscope, a 3-axis compass, and a barometer and incorporates a sensor fusion algorithm that enables the IMU 1430 to accurately derive a 3-dimensional (3D) position and a translational velocity associated with the camera. In some embodiments, the measurements acquired by the IMU are cm and cm/s accurate.

The IMU 1430 updates its measurements at a fixed update rate. Not all measurements, however, are necessarily updated at the same rate. For example, measurements derived from data sensed by the accelerometer may have a different update rate than measurements derived from data sensed by the gyroscope (e.g., 160 Hz and 500 Hz respectively). Thus, when the update rates differ for different IMU sensors, a single measurement corresponding to a lower update rate may be used in combination with different measurements corresponding to a higher update rate.

Update rates employed by the IMU overall and its components are generally depended on the technical characteristics and/or requirements of the IMU components, desired accuracy, computation characteristics, computation requirements, and/or the like. For example, typical MEM's based gyroscopes are able to provide readings upwards of 1 kHz. Further, using a lower update rate to obtain the accelerometer measurements (e.g., 160 Hz) than to obtain the gyroscope measurements (e.g., 400-500 Hz) allows the IMU to derive reliable measurements from both sensors, and also to conserve computing power and memory by not performing computations that would not otherwise improve the IMU reliability or accuracy. Also, small gimbal structures may require faster control than larger, heavy units that inherently have a greater inertial damping. Accuracy achieved by sampling a greater number of readings to enable better averaging may need to be balanced against a control bandwidth greater than frequencies which may be constituent in disturbance noise. In some circumstances, however, control achieved at lower rates, such as 50 Hz, may be sufficient, for example in an active stabilization system mounted on a vehicle.

The stabilization control process 1400 employs a closed loop electro-mechanical feedback based on the proportional-integral-differential control technique. Both the tilt angle (attitude) and the tilt rate (motion, slew) of the camera 1410 are considered to determine the tilt angle update. The stabilization control process includes two nested loops, an outer loop for correcting angle errors and an inner loop for correcting control errors and stabilizing the tilt motion.

The outer, angle-based loop includes a P control element 1440, which receives, as input, a tilt angle 1434 of the camera 1430, as detected by the IMU 1430, and a command tilt angle 1444 for the camera 1410. The command angle 1444 generally reflects intentions of the camera operator, actual or remote, at the time. More specifically, the command tilt angle 1444 may be set by a remote operator via a remote link, by the camera operator via a control device, such as a thumb joystick, or derived from the camera operator's intentions expressed by the operator lifting and steering gimbal handles, such as the handles 113 shown in FIG. 1, and determined based on the gimbal joint angles. The P control element 1440 compares the command and measured tilt angles and sets a command tilt rate 1446 for the motion that would result in the command tilt angle. In particular, P control element 1440 senses an error between the command and measured tilt angles 1444 and 1434, amplifies the error by a proportional gain constant, and feeds the amplified error into the inner loop, thereby minimizing the angle error.

The inner, rate-based closed feedback loop includes a PID control element 1450, which receives, as input, a tilt rate 1436 of the camera 1410, as detected by the IMU 1430, and the command tilt rate 1446, as set by the P control element 1440. The PID control element 1450 compares the two tilt rates to detect a control error, which it amplifies using proportional, integral, and differential constants to set a control signal 1452 (such as a torque value) for controlling movement of a brushless DC motor 1420 (or another actuator, such as a motor, a gearbox, a belt reduction drive, or the like). In particular, the output of the PID control element 1450 is fed to the brushless DC motor 1420 via a driver output element 1460 to form an overall closed loop feedback circuit, thereby causing acceleration, deceleration (brake), or a reverse movement of the brushless DC motor 1420. The driver output element 1460 outputs 3-phase currents to the motor 1420 and forms a local control loop together with an angle resolver 1470 for controlling the 3-phase currents accurately and dependent on the motor phase angle. In some embodiments, the outputs of the driver output element 1460 effectively control a torque generated by the motor 1420 to accelerate/decelerate gimbal's tilt rotation.

Generally, the stabilization control process has a fixed update rate (e.g., 400 Hz) so as to enable discrete control decisions by the stabilization controller 1400. However, the update rate may be slower, or faster, depending on a specific design of the actively stabilized gimbal. Further, in some embodiments, the stabilization control process 1400 is digital and implemented using software.

Depending on a particular application, the stabilization control process 1400 is replicated for some or all of the tilt, roll, and pan axes with the servo motors employed for the tilt, roll, and pan axes respectively. In response to the commands issued by the stabilization control processes for the respective axes, these motors operate to correct disturbances to the camera's pointing direction, automatically, such as to maintain a constant pointing angle (attitude) for each of the axes.

Accordingly, the actively stabilized camera gimbal corrects disturbances to the camera pointing direction automatically and maintains a constant pointing angle for the camera based on the gyroscopic feedback and on the command attitude fed into the active stabilization controller. While a camera operator is able to translate or move the camera's location, a remote operator is typically required to change the pointing direction (pan, tilt, and roll angles/rates) of the camera, such as via a remote link, using a joystick or other controller. That is, two operators must translate and point the gimbal (camera) simultaneously. Therefore, successful filming requires careful collaboration between the camera operator and the remote operator when controlling the translation route and pointing plan of the camera respectively. A further complexity of this dual-operator control arrangement is that multiple radio transmitters, extra equipment, and resources that are employed to support it. Alternatively, the camera operator himself or herself may be able to set a desired angle using a thumb joystick or other controller on the hand-held active stabilization system. However, similarly to the dual-operator approach, this single-operator control approach may compromise gimbal maneuvering and is difficult to use to achieve a desired result consistently.

To address this problem, in some embodiments, the active stabilization controller is adapted to enable the camera operator to steer the camera's pointing direction by rotating, tilting, panning, or otherwise moving a gimbal support base using a steering member, such as gimbal handle(s), to cover each possible movement of camera pan, tilt and roll and without sacrificing the benefits of active stabilization. Further, in some embodiments, the active stabilization system may be mounted on a moving object, such as a vehicle, persons, animal, and the like. In such embodiment, any component of the gimbal frame that is in a rotational relationship with the camera may serve as a steering member, as its rotational movements will be caused by the movements of the moving object.

Figure 15:
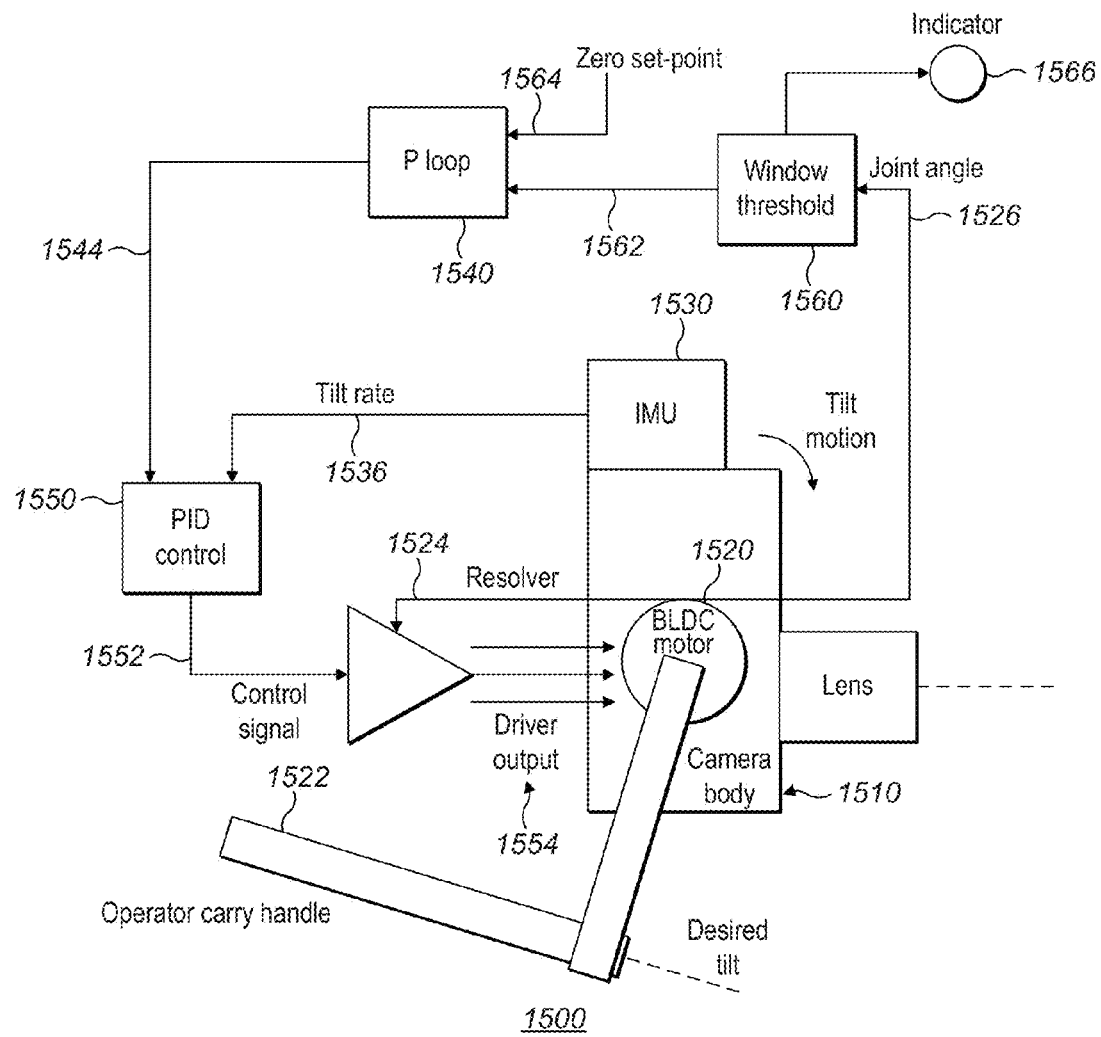
FIG. 15 is a flowchart of a single axis controller with a window threshold for enabling steering of the camera by rotating a steering member of an active stabilization system, according to some embodiments.

FIG. 15 shows suitable modifications, according to some embodiments, to a single axis (tilt-axis) active stabilization controller (control process), such as the stabilization control process discussed with respect to FIG. 14, for enabling a camera operator to steer or change a pointing direction of an actively stabilized camera 1510 by rotating (steering, moving, or the like) a steering member 1522, such as gimbal handle(s). Similar modifications can be made to a pan-axis active stabilization controller for controlling the pan angle of the camera and to a roll-axis active stabilization controller for controlling the roll angle of the camera.

More specifically, similarly to the stabilization control process 1400, an active stabilization control process (controller) 1500 implements two nested control loops: an outer angle-based loop and an inner rate-based loop. As in FIG. 14, the inner rate-based loop is a PID loop controlled by a PID control element 1550. The PID control element 1550 receives a tilt rate 1536 of the camera 1510, as detected by an IMU 1530 and compares it to a tilt rate 1544, determined and provided by the outer angle-based loop to detect a control error. The PID control element 1550 amplifies the control error using proportional, integral, and differential constants (parameters) to set a control signal 1552 for controlling movement of a brushless DC motor 1520. The output of the PID control element 1550 is then fed to the brushless DC motor 1520 via a driver output element 1522 to form an overall closed loop feedback circuit, thereby causing acceleration, deceleration (brake), or a reverse movement of the brushless DC motor 1520.

However, unlike the stabilization controller of FIG. 14 that executes the outer control loop based on the camera's measured tilt angle 1434 and the commanded tilt angle 1444, received as a "set-point," for example, from a remote operator, the outer angle-based control loop of the stabilization controller 1500 instead processes joint angle measurements for the joint angle between the steering member 1522 and the camera mounted IMU 1530. Such measurements may be acquired from the actuator shaft resolver output 1526. To enable steering of the camera's pointing direction responsive to rotating of the steering member 1522 based on the joint angle measurements, the angle-based loop of controller 1500 is configured to effectively zero the joint angle in tilt. That is, when the camera's pointing (tilt) angle is effectively the same as the joint (tilt) angle, the active stabilization controller is stable and converged. Accordingly, a control element 1540 of the outer loop receives, as input, a zero commanded angle 1564 and a windowed joint angle measurement 1562 provided by, for example, an internal resolver of the actuator 1520.

Further, although in some embodiments, the angle-based control loop of the controller 1500 is a P control loop, similar to the angle-based loop of the controller 1400, the angle-based loop of the controller 1500 is not necessarily a P control loop. Rather, in some embodiments, this loop is configured as a PI control loop. The P control parameter provides for a stronger (or faster) response to larger errors, while the I control parameter sets a time-constant (parameter), which can be tuned to provide a slow and fluid response, when a sufficiently large value is chosen. In some other embodiments, however, the outer angle-based loop is configured as a P control loop similar to the outer control loop of the active stabilization controller of FIG. 14.

To prevent the active stabilization system (gimbal) from moving, the camera operator needs to hold the joint angle at a zero value continuously. This may be difficult to achieve in practice, and there are likely to be small angle errors requiring constant corrections (stabilization). In the context of the controller 1500, the quality of resulting video may suffer due to inadvertent movements resulting in the camera's pointing angle being changed unintentionally. To address this potential problem, in some embodiments a threshold window 1560 (thresh-holding function) is set in relation to the obtained joint angle measurements. When the joint angle measurement 1526 falls within the threshold window 1560, a joint angle measurement 1562, as outputted by the threshold function 1560 and registered and processed by the control element 1540, equals zero. However, when the joint angle measurement 1526 exceeds the set threshold window, the threshold function 1560 reduces the joint angle measurement 1526 by the threshold value of the threshold window to derive to the joint angle measurement 1562, which is then provided to the control element 1540. This may be described as follows:

If (angle_measured>angle_threshold)
then angle_out=angle_measured−angle threshold;
If (angle_measured<−angle_threshold)
then angle_out=angle_measured+angle threshold,
where angle-measured is the joint angle measurement 1526, angle-out is the joint angle measurement 1562, and angle_threshold is the valued of the threshold window 1560 set as [−angle_threshold, +angle_threshold].

Accordingly, the threshold function 1560 effectively sets a dead-band zone, in which the camera operator does not need to worry about accurate and consistent pointing, at least to a certain degree. That is, while rotational movements of the steering member 1522 are within the dead-zone defined by the threshold window, the pointing angle of the camera is consistently maintained at the value of the commanded pointing angle. However, as soon as the camera operator's rotational movement of the steering member exceeds the dead-band region (causes a corresponding joint angle measurement to exceed the threshold window), the controller 1500 will start slowly to change the pointing angle of the camera, responsive to the rotational movement of the steering member 1522 and proportional to the angle_out value, by repeatedly executing the outer and inner control loops.

In some embodiments, the camera operator is provided with a visual indication of whether the current movements of the steering member fall within the dead-band zone. For example, the controller 1500 may include a visible indicator, such as a light-emitting diode (LED), that is lit responsive to determinations made by the threshold function 1560, such as when the rotational movement is inside (or outside) the dead-band zone. In this manner, the camera operator has a clear indication concerning whether his or her steering movement would affect the camera's pointing angle. Although a visual indicator is preferable, other means of indication may be used, for example sound, such as a sound generated by an actuator by manipulating its commutation signals in a certain frequency or phase so as to cause magneto-restrictive generated noise, without affecting actuator's motion control effectiveness.

Although the threshold value of the threshold window can be pre-set or pre-determined, in some embodiments, it is adjustable and is typically set between 10 and 30 degrees. However, it may also be greater or smaller, depending on a filming situation, environment, camera operator's preferences and/or capabilities, and the like. For example, the camera operator with a steady hand may decide to effectively disable the threshold window by setting the threshold value to zero. Further, the camera operator may be provided with a number of pre-set threshold values for different filming scenarios and/or different axes. Furthermore, when an active stabilization controller, such as the controller of FIG. 15, is implemented and activated for more than of the pan, tilt, and roll axes, different thresholds may be set for different axes.

Figure 16:
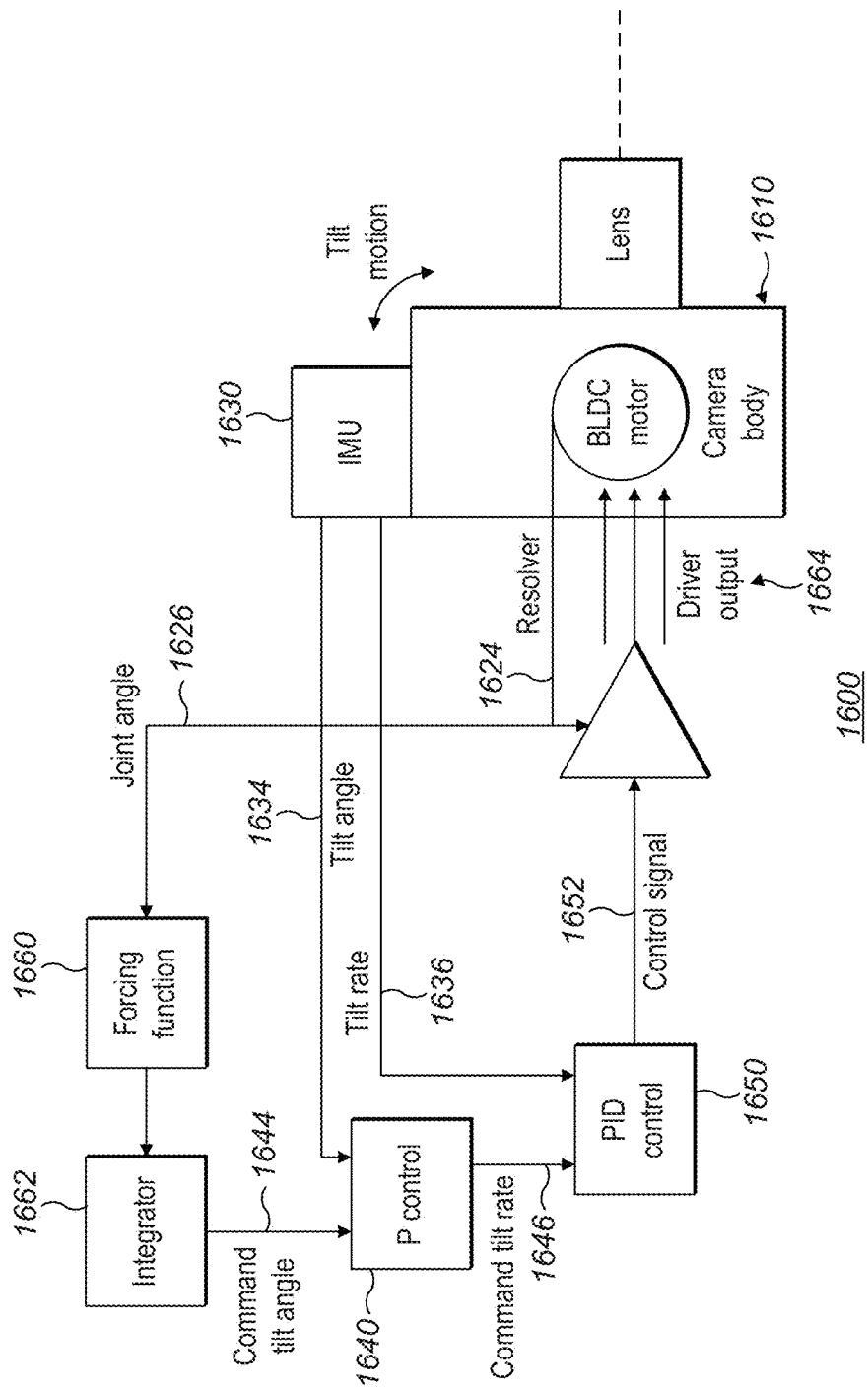
FIG. 16 is a flowchart of a single axis controller with a forcing function for enabling steering of the camera by rotating a steering member of an active stabilization system, according to some embodiments.

In some embodiments, to provide for a fluid response, a non-linear forcing function for changing the camera's pointing angle as a function of a joint angle error is employed instead of the I control parameter of the outer angle-based loop. FIG. 16 shows suitable modifications to a single axis (tilt-axis) active stabilization controller (control process), such as the stabilization control process discussed with respect to FIG. 14, for incorporating a forcing function into the controller and enabling the camera operator to steer or change a pointing direction of an actively stabilized camera 1610, according to some embodiments. Similar modifications can be made to a pan-axis active stabilization controller for controlling the pan angle of the camera and to a roll-axis active stabilization controller for controlling the roll angle of the camera.

The angle and rate based control loops of a stabilization control process (controller) 1600 are generally the same as for the controller 1400 of FIG. 14. More specifically, the controller 1600 implements an angle-based P-loop and a rate-based PID loop with P and PID control elements 1640 and 1650 respectively. The P control element receives and compares a tilt angle 1634 of a camera 1610 detected by an IMU 1630 and a command tilt angle 1636 to issue a command tilt rate 1646, which is then provided to the rate-based PID loop. The PID control element 1650 also receives a tilt rate 1636 of the camera 1610, as detected by the IMU 1630 and compares the two tilt rates to detect a control error, which it amplifies using proportional, integral, and differential constants (parameters) to set a control signal 1652 for controlling movement of a brushless DC motor 1620. The output of the PID control element 1650 is then fed to the brushless DC motor 1620 via a driver output element 1622 to form an overall closed loop feedback circuit, thereby causing acceleration, deceleration (brake), or a reverse movement of the brushless DC motor 1620.

Thus, similarly to the active stabilization control process 1400, the active stabilization control process 1600 is able to perform the active stabilization process for stabilizing a pointing direction of the camera. However, unlike the stabilization control process 1400 that maintains the camera's pointing angle based on the command tilt angle 1444, received as a "set-point," for example, from a remote operator via a remote link, the stabilization control process 1600 enables the camera operator to change the camera's pointing direction by and responsive to rotation (steering, movement, or the like) of the gimbal steering member, such as handle(s), support base, a mounting member, and the like.

Although the description herein uses gimbal handles as a primary example of the steering member, similar principles apply if the steering member is, for example a support base or mounting member, attached to a moving object, such as a vehicle, unmanned aerial vehicle, and the like. That is, although the camera operator does not actively steer the steering member, the steering member experiences a rotational movement due to the movement of the object to which the gimbal (active stabilization system is attached). For example, a vehicle turning a corner will cause a rotational movement of the steering member relative to the pan axis.

More specifically, in the example of FIG. 16, the stabilization control process 1600 determines the commanded tilt angle 1644 based on joint angle measurements and using a forcing function 1660. In particular, the forcing function 1660 processes joint angle measurements 1626 to determine incremental updates for updating (numerically integrating) the commanded tilt angle 1644 by an integrator 1662. The updated commanded angle 1644 is provided to the P control element 1640, at each control loop update, to be processed in a normal stabilization manner. That is, for each control loop cycle (update, "tick," or the like), the output of the forcing function 1660 is added to the commanded pointing angle, where the P/PID loop portion of the control loop update stabilizes the camera's pointing angle in accordance with the new, updated commanded pointing angle. This process causes the active stabilization system (gimbal) to steer the camera in a desired direction at a certain rate.

If the camera operator stops moving the steering member and maintains the steering member at the same attitude, then the change rate will decrease due to a progressively smaller error, with each update, until the movement of the pointing angle stops. If the forcing function incorporates a threshold window and a threshold value of the threshold window exceeds zero, the camera's pointing angle movement will stop at the border (edge) of the threshold window. If the camera operator chooses to move the steering member continuously, then the pointing direction of the camera will start changing as well, though at a different rate, until an equilibrium rate is achieved, effectively matching, but lagging, the rate with which the steering member is moved. That is, the initial period of movement of the camera's pointing direction involves a period of acceleration until the equilibrium is reached. The camera operator is able to control this acceleration by moving the steering member at a faster or slower rate.

Generally, the behavior (movement) of the camera's pointing angle responsive to the rotation of the steering member largely depends on the nature of the forcing function 1660. The forcing function 1660 is typically a non-linear function that is designed to output very small values for small angles and much larger values for large angles. Preferably, the forcing function is symmetrical and odd, with crossing the axis intercepts at zero. For example, in some embodiments the forcing function is represented by the following equation:

$$F(\text{angle}) = S \times \text{angle}^n \qquad (1)$$

where angle is the joint angle measurement 1626, and n is the power factor, preferably, of an odd number, and S is a scale constant for proportionally scaling the forcing function to achieve a desired behavior.

Further, the forcing function is generally designed to give a positive output to a positive angle, and a negative output to a negative angle. That is, if for example, steering to the right is interpreted by the active stabilization system as an increase in the value of the pan angle, the forcing function will increase the commanded angle with each control loop update, if tilting down is interpreted by the system as a decrease in the values of the tilt angle, the forcing function will decrease the commanded angle with each control loop update, and the like.

The camera operator may tailor the behavior of the forcing function to a particular scenario by adjusting the curve shape and the threshold window. In this manner, it is possible to perform high finesse pointing control suitable for long zoom lens, close in action movements, and other scenarios.

As stated above, similar to the controller 1500 of FIG. 15, the controller 1600 sets a dead-band zone via a threshold window. However, unlike the controller 1500 which causes a somewhat abrupt movement by the camera when crossing the border of the dead-band region, the controller 1600 changes camera's pointing angle in small steps for small errors and much larger steps for increased errors. In this manner, the abruptness of passing through the dead-band region border is reduced and a more fluid movement is achieved. As the commanded angle being increased/decreased with each update cycle, based on the forcing function output, the pointing angle would gradually, equate to the threshold window edge (border), for example if the steering movement was stopped. At that point, the outcome of the forcing function will become zero and the pointing angle motion will stop. The forcing function approach also allows immediate and fast movement, should one be required, by simply moving the steering member to a more extreme angle.

Figure 17:
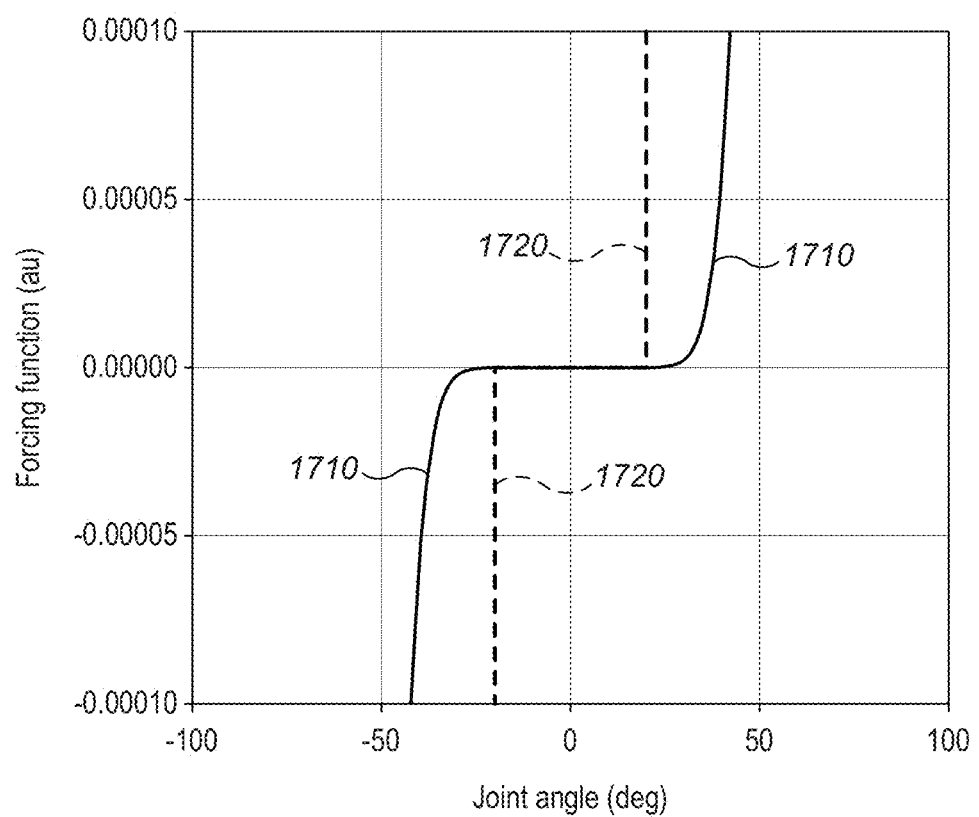
FIG. 17 shows a graph depicting an exemplary forcing function, based on a threshold window of +/−20 degrees, as compared to an abrupt function, based on the same threshold window.

FIG. 17 illustrates a graph 1700 depicting an exemplary forcing function 1710, based on a threshold window of +/−20 degrees, as compared to an abrupt function 1720, based on the same threshold window. The forcing function 1710 is non-linear curve based on an angle error raised to the fifth power. As shown, the forcing function 1710 provides small outputs in the proximity to the threshold window and increases its outputs rapidly further out from the threshold window. That is, the forcing function approximates the abrupt function 1720 in the proximity of the threshold window, smoothing the abruptness of the function 1720, and provides a strong effect at extremes.

Figure 18:
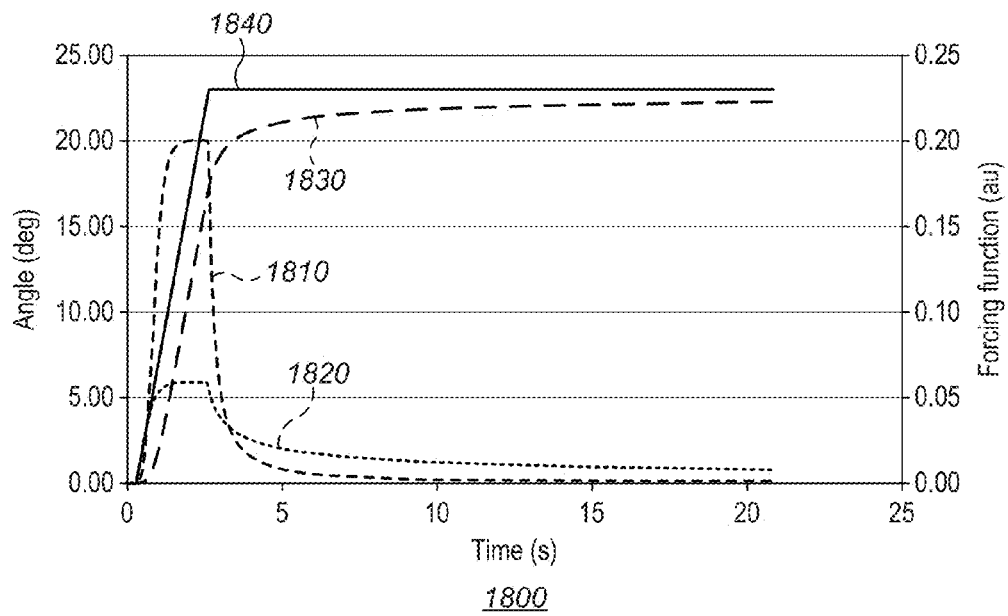
FIG. 18 shows a graph comparing changes in a system's world angle, an exemplary forcing function having no threshold window, a camera's pointing angle, and a joint angle in accordance with an exemplary scenario.
Figure 19:
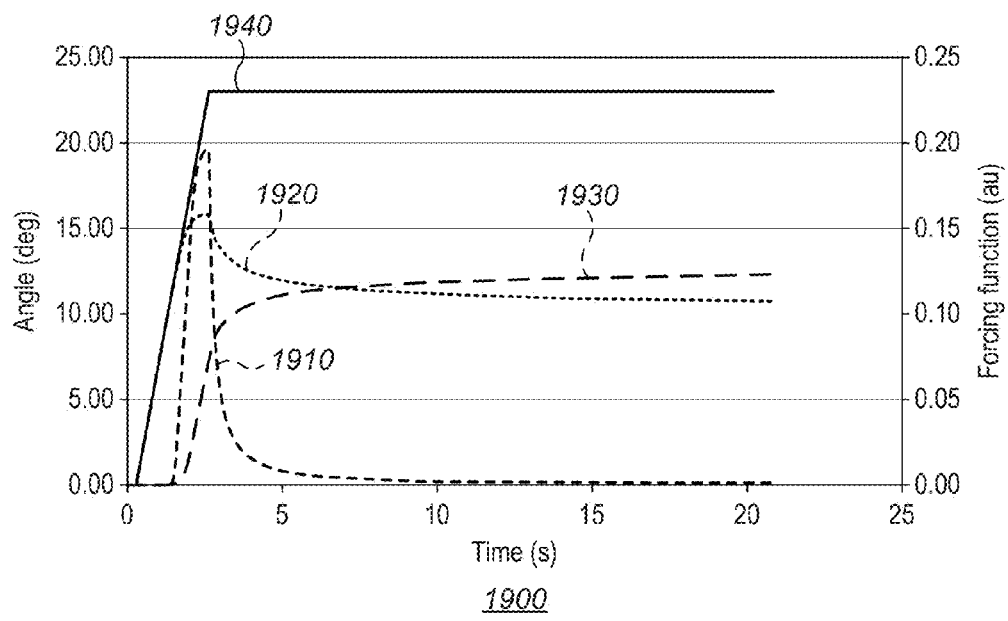
FIG. 19 shows a graph comparing changes in a system's world angle, an exemplary forcing function based on a threshold window of +/−10 degrees, a camera's pointing angle, and a joint angle in accordance with an exemplary scenario of FIG. 18.

FIGS. 18 and 19 show graphs 1800 and 1900 comparing changes in a system's world angle 1840 and 1940, a forcing function 1810 and 1910, a camera's pointing angle 1830 and 1930, and a joint angle 1820 and 1920 between a system's steering member and a camera mounted IMU, for a certain exemplary scenario. In FIG. 18, no threshold window has been set (the threshold window has been set to equal zero), while in FIG. 19, the forcing function is based on a threshold window of +/−10 degrees. In the scenario of FIGS. 18 and 19 the active stabilization system is initially at 0 degrees (in a horizontal position), then its angle is rapidly increased to 23 degrees by steering (rotating) the steering member upward, and then its movement is stopped upon reaching the 23 degrees angle. In other words, the active stabilization system returns to a stationary state at 23 degrees. This movement is reflected by the world angle line 1840, reflecting a steering member's (handle) angle in compass coordinates.

The joint angle line 1820, depicting changes in the joint angle between the steering member and the camera mounted IMU, peaks at about 6 degrees, at which point the camera starts moving. The joint angle line 1820 then follows the system's constant movement. A lag between the system and camera's movements established at the time the camera starts moving is maintained until the system comes to a stop. Thereafter, the joint angle line 1820 tends toward zero, although fairly slowly, as it catches up. In this manner, a slow stop that is subtle on the camera and visually appealing may be achieved in a captured video.

In FIGS. 18 and 19, the forcing function 1810 is a cubic function that is scaled by a certain (arbitrary) scale factor to achieve the desired visual effect. The scale factor can be tuned. The camera's pointing angle line 1830, reflecting changes in the actual pointing angle of the camera, effectively lags the world steering member line 1840, slowly and smoothly catching up when the system stops moving.

FIG. 19 illustrates the same scenario as FIG. 18, with a difference that the threshold window has been set to +/−10 degrees. Thus, although the system's angle (steering member's angle) changes from 0 to 23 degree, the camera's pointing angle changes only from 0 to 13 degrees, at which point, the motion stops. This difference reflects the value of the chosen threshold window. Further, because of the set threshold window, the output of the forcing function 1910 is zero for angles up to 10 degrees. In this manner, the movement of the pointing angle 1930 is delayed in relation to the system movement 1940. The joint angle line 1920 peaks at about 16 degrees then tending toward 10 degrees (the upper threshold value), after the system stops moving.

Although, as described with respect to FIGS. 16 to 19, the forcing function is applied to control angle updates, in some embodiments, the forcing function is used to control angular rate updates instead. By comparing the joint angle (e.g., tilt angle) and the gimbal attitude (e.g., tilt attitude), as measured by the IMU, an error is determined, to which the same forcing function is applied to derive an updated commanded angular rate supplied to the rate-based control loop. Thus, if the joint angle and the attitude measured by the IMU are dissimilar, then a steering motion will be commanded. The threshold window can be applied in the same manner.

Figure 20:
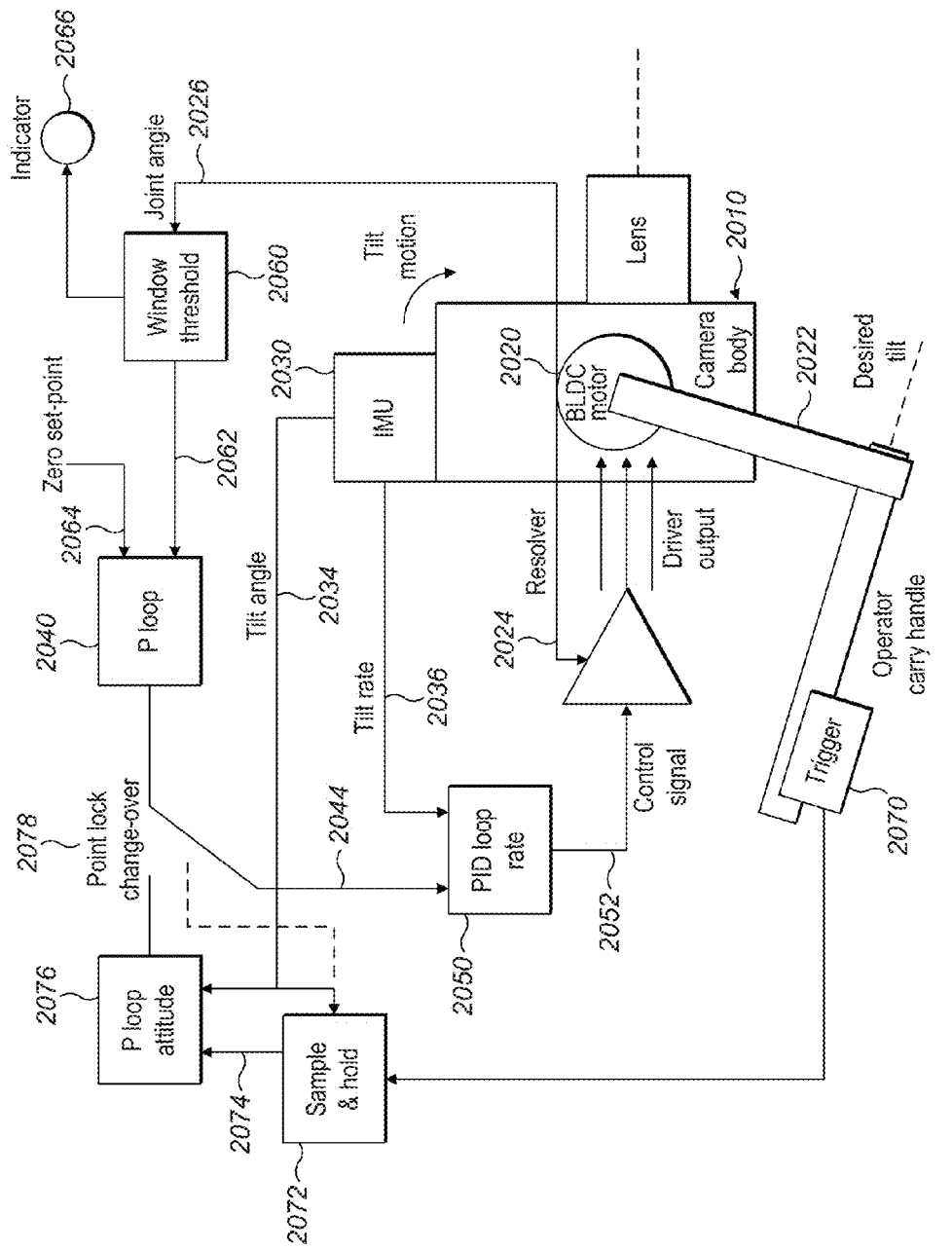
FIG. 20 is a flowchart of a single axis controller that enables locking of a camera's pointing angle, while in a steering mode, according to some embodiments.

In some embodiments, further enhancement to an active stabilization controller, such as the controllers 1500 and 1600 are introduced. FIG. 20 illustrates an active stabilization controller 2000 which enables the camera operator to lock a current camera's pointing angle temporarily, returning to the normal stabilization mode to maintain the locked angle. In other words, the controller 2000 provides the camera operator with an opportunity to inhibit steering of the camera's pointing angle responsive to rotational movements of the steering member at-will (steering mode) and maintain the last measured pointing angle.

More specifically, FIG. 20 expands the stabilization control process 1500 of FIG. 15 by introducing a trigger 2070 for inhibiting the steering mode and a sample and hold element 2072 and a P control element 2076 for enabling substitution of the outer joint angle-based control loop to enable a normal stabilization process. The trigger 2070 is a button, actuator, or the like, located on a steering member 2022, or at another location in the active stabilization system within an easy reach by the camera operator. By pushing, pulling, or otherwise engaging the trigger 270, the camera operator inhibits the steering mode, locking the current pointing angle as an angle to be maintained by the controller 2000 until the trigger 2070 is released.

For this purpose, when the trigger 2070 becomes engaged, the sample and hold unit 2072 is instructed to sample a current pointing angle (attitude) of the camera and store it as a new commanded pointing angle. Further, responsive to the trigger 2070 being engaged, a point lock switch 2078 switches the input path from a PI control element 2040 to a PID control element 2050 to a second input path from a P control element 2076 to the PID control element 2050. That is, the point lock switch 2078 effectively substitutes the outer PI joint angle-based loop, controlled by the control element 2040, with a tilt angle-based loop, controlled by the P control element 2076. Upon switching to the second input path, the controller 2000 is able to execute a normal stabilization process, such as described with respect to FIG. 14, in accordance with the commanded angle 2074 stored and supplied by the sample and hold element 2072. In this manner, the camera's pointing angle 2034, as measured by the IMU 2030, at the time the trigger 2070 becomes engaged, becomes the commanded pointing angle 2074 and is maintained, until the trigger 2070 is released.

When the trigger 2070 is released, the point lock switch 2078 switches back the control loop to the original input path, thereby reverting the controller 2000 to the steering mode and enabling the camera operator to perform smooth steerage. Accordingly, by engaging the trigger 2070 to inhibit the steering mode, the camera operator does not need to worry about unintentionally passing outside the dead-band region, when he/she is certain that he/she has locked the shot and no changes to the camera's pointing angle are needed. Thus, some uncertainty associated with the use of the window threshold function is removed, when its benefit is not required.

The active stabilization system may include a single trigger to inhibit the steering mode as a whole, or to have separate triggers for disabling the steering mode for each or some of the pan, tilt, and roll axes. Further, in some embodiments, a hybrid mode is implemented, where a remote operator controls a pointing angle of the camera with respect to one of the axes, for example, the tilt axis, via a joystick or the like, and the gimbal carrying operator controls a pointing angle of the camera for another axis, e.g., the pan axis, using the steering function. This hybrid mode may be particularly appropriate in filming of chase scenes where the gimbal operator is more able to anticipate required pan movements while the tilt control requires more subtle finesse that would be more suitable for a remote operator.

In some embodiments, the camera (gimbal) operator is provided with a small HD display on the steering member to locally aid framing of the shot.

The controllers 1500, 1600, and 2000 of FIGS. 15, 16, and 20 respectively enable the camera operator, translating the camera, to also intuitively control the camera pointing angle in a smooth way and without sacrificing the benefits of active stabilization. In order to control the steerage of the steering member, such as the gimbal support handles, the operator rotates the steering member (handles) in an intended direction and the gimbal (active stabilization system) smoothly tracks the motion, adjusting the pointing angle of the camera correspondingly. For example, in a nominally horizontal stance, the gimbal remains horizontal. If the operator tilts the gimbal handles forward, then the gimbal, starts tilting downward at a rate proportional to the rotational movement of the steering member, in some embodiments only after a threshold window border has been crossed. Tilting the gimbal handles backward will cause an upward movement of the gimbal and the camera's pointing angle in tilt. In this manner, by tilting the handles up and down (rotating the steering member around the tilt axis), the camera operator controls the pointing tilt angle of the camera. The pan and roll angles are processed and controlled in a similar manner.

The camera operator may elect to lock off the steering mode for some or all of the axes, for example, activating the steering mode for a pan action only. If the camera operator were to roll the handles (steering member) away from being horizontal, and then also apply pan, the same intuitive movement will be required and applicable.

Although, the controllers 1500, 1600, and 2000 described to use joint angle measurement in relation to an axis corresponding to the controlled pointing angle, e.g., pan joint angle measurements for the pan angle steering, there are scenarios where joint angle measurement of different axis(es) may be required to support the steering mode properly. Accordingly, in some embodiments, an active stabilization controller, such as the controllers 1500, 1600, and 2000, is configured to determine such scenarios and obtain required measurements.

For example, when the camera operator tilts the handles back and up to achieve some additional height, the roll joint is performing pan and the pan joint is performing roll. Thus, although the camera operator may still require the steering mode for panning, if the handles are moved in a pan sense, the roll joint becomes the commanding measurement. That is, the controllers 1500, 1600, and 2000 would obtain roll joint angle measurements to execute the methods described with respect to FIGS. 15, 16, and 20 for the pan axis.

Further, in certain scenarios, joint angle measurements for more than one axis may be required. For example, at about 45 degree pan angle, both the roll and pan joint angle measurements are required to enable the controllers 1500, 1600, and 2000 to determine probable pointing angle adjustments. In such circumstances, in some embodiments, the controllers 1500, 1600, and 2000 interpret a steering motion, e.g., a pan motion by applying a mathematical transform from the handles (steering member) pointing vector to the gimbal frame of reference, using Quaternion methods. In this manner, the pan steering motion, for example, can always be interpreted as a pan motion, regardless of the attitude of the handles, because the interpretation is based on a Z-axis rotation. That is, in such embodiments, the motion is resolved around a vertical axis, with respect to Earth's gravity vector, based on joint angle measurements for two or three axis, and then provided to the control loops as a change in a command pointing directions. That a special scenario requiring a slightly different approach, such as the examples just described, exists is generally determined based on a current pointing angle of the camera and/or the current pointing angle of the steering member. In case of the positive determination, corresponding adjustments to the methods described herein, such as how the joint angle measurements are derived, are then made.

Figure 21:
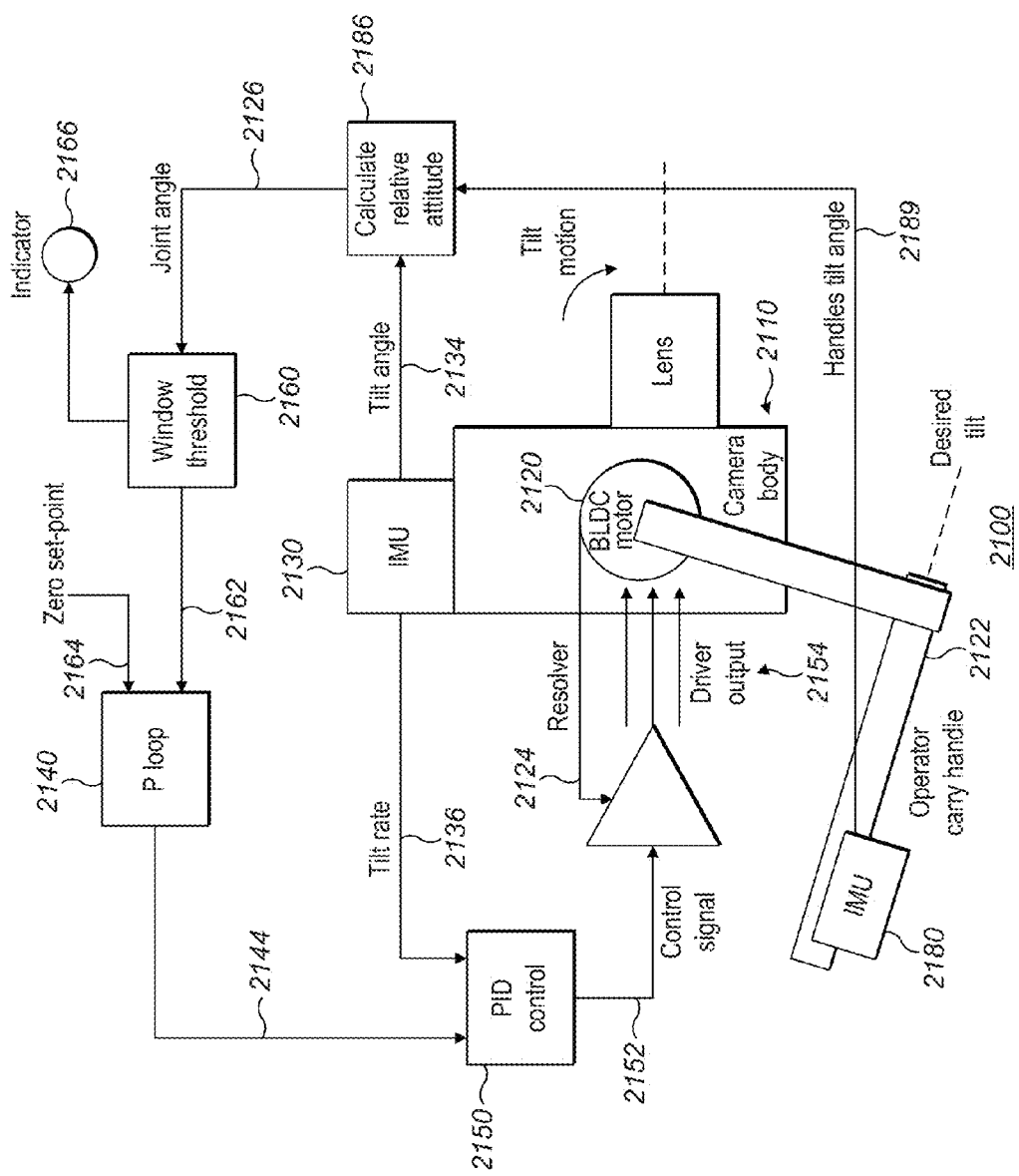
FIG. 21 is a flowchart of a single axis controller using two inertial measurement units to enable a steering mode, according to some embodiments.

In some embodiments, instead of measuring the joint angles and using them to directly control the camera's pointing angle, via e.g., a forcing function, measurements obtained by a second IMU, located on the steering member, such as handle(s) are used. FIG. 21 illustrates an example of a controller 2100 that employs a second IMU 2180 to enable the steering mode. The control loop implemented by the controller 2100 is generally the same as the control loop implemented by the controller 1500 discussed with respect to FIG. 15. However, unlike the controller 1500 that bases its steering mode determinations based on joint angle measurements, the controller 2100 obtains camera angle measurements 2134 from a camera mounted IMU 2130 and steering member angle measurements 2184 from the steering member mounted IMU 2180 to derive, at control element 2186, a relative joint angle measurement 2126, for example, using Quaternion methods. The relative angle measurement 2126 is then used in the same manner as the joint angle measurement 1526 of FIG. 15.

Although, FIGS. 20 and 21 have been described without reference to a forcing function, both controllers 2000 and 2100 can be re-configured to incorporate a forcing function using the methodologies discussed with respect to FIG. 16.

Figure 22:
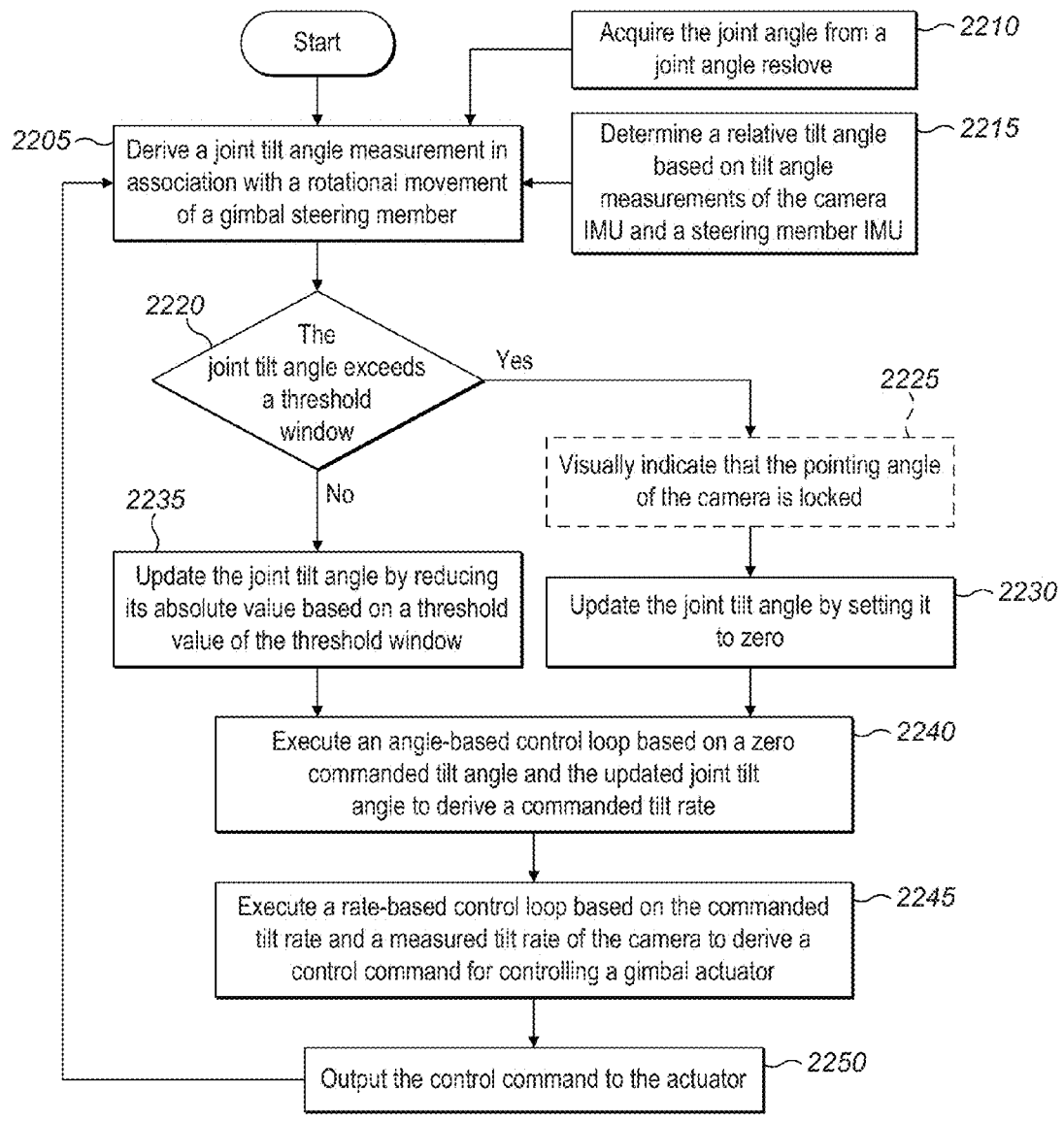
FIG. 22 is a flowchart of a method for adjusting a pointing angle of an actively stabilized camera responsive to rotational movements of a steering gimbal member, according to some embodiments.

FIG. 22 illustrates a method for adjusting a pointing angle of an actively stabilized camera responsive to rotational movements of a steering gimbal member, such as handles, in accordance with some embodiments. As described, the method 2200 does not rely on a forcing function to enable the steering mode.

The method 2200 starts with step 2205 at which a joint angle or a relative angle is derived in association with a rotational movement of a gimbal steering member. As described with respect to, for example, FIGS. 15, 16, 20, and 21, depending on the current pointing angle of the gimbal (active stabilization system), the joint (relative) angle measurements may be derived from direct measurement of a joint angle for a corresponding axis, such as from a resolver of a respective actuator, direct measurements of a joint angle for a different axis, a combination of joint angle measurements for different axis (step 2210), and/or by comparing direct angle measurements from two different IMUs, a camera mounted IMU and a steering member (handle) mounted IMU (step 2215).

At step 2220, a determination is made whether the angle derived at step 2205 exceeds (lies outside of) a threshold window. Generally, when the angle is within the threshold window, a corresponding movement is interpreted as an unintentional disturbance and such a disturbance is corrected to maintain a commanded pointing angle of the camera. In other words, the pointing angle of the camera is locked. To achieve this result, as step 2230, the joint (relative) angle is updated to zero, indicating that no steering motion is required, and provided to an angle-based control loop (step 2240).

In some embodiments, a camera operator is provided with an indication that the pointing angle is locked. Such an indicator informs the camera operator that the camera's pointing angle will be maintained (stabilized), despite some rotational movements of the steering member. Thus, the method 2200 includes an optional step 2225 of visually indicating that the pointing angle of the camera is locked. The indicator includes, but is not limited to, a LED indicator, screen indicator, or the like. Although a sound indicator may be used instead, such an option is not typically used so as to not affect the sound recording.

If at step 2220 a determination is made that the angle derived at step 2205 exceeds the threshold window, the method proceeds to step 2235. At this step, the joint (relative) angle measurement is reduced by a value of the threshold window. In this manner, a motion that is proportional to an angle value in excess of the threshold can be achieved. The updated angle measurement is then provided to the angle-based control loop.

The angle based-control loop is executed at step 2240. As described with respect to FIG. 15, the steering mode, without use of a forcing function, is achieved by zeroing the joint angle by the angle-based control loop. That is, the angle-based control loop is executed based on the zero commanded angle and the updated joint angle. Thus, if the method 2200 arrived to step via step 2225 (the original measurement is within the threshold window), the output of step 2240 will be zero and no steering motion/adjustment for the pointing will be commanded. It should be noted, that the pointing angle may still be adjusted to maintain the commanded pointing angle (correction motion). However, if the method 2200 arrived to step 2240 via step 2235 (the original measurement exceeds the threshold), at step 2240, a commanded rate will be derived based on the updated joint angle.

At step 2245, an inner rate-based control loop update is executed based on the output of step 2240—the commanded rate—and a current angular as obtained by a camera mounted IMU to derive a command for controlling the camera's pointing angle. This command is then provided at step 2250 to an actuator for execution.

The method 2200 generally describes a method that can be executed by an active stabilization controller, such as the controller 1500 of FIG. 15, to enable the steering mode. If the current joint (relative) angle measurement is within the threshold window, no steering motion deriving from the commanded angle will be commanded. Rather, the commanded angle will be maintained, and only correction motion may be commanded. That is, any disturbances within the threshold window are corrected to maintain the commanded angle. However, if the current joint (relative) angle measurement exceeds the threshold window, a command will be issued to adjust the camera's pointing angle in a direction of the rotational movement of the steering member. The adjustment motion will lag the steering member motion due to the set threshold window.

Figure 23:
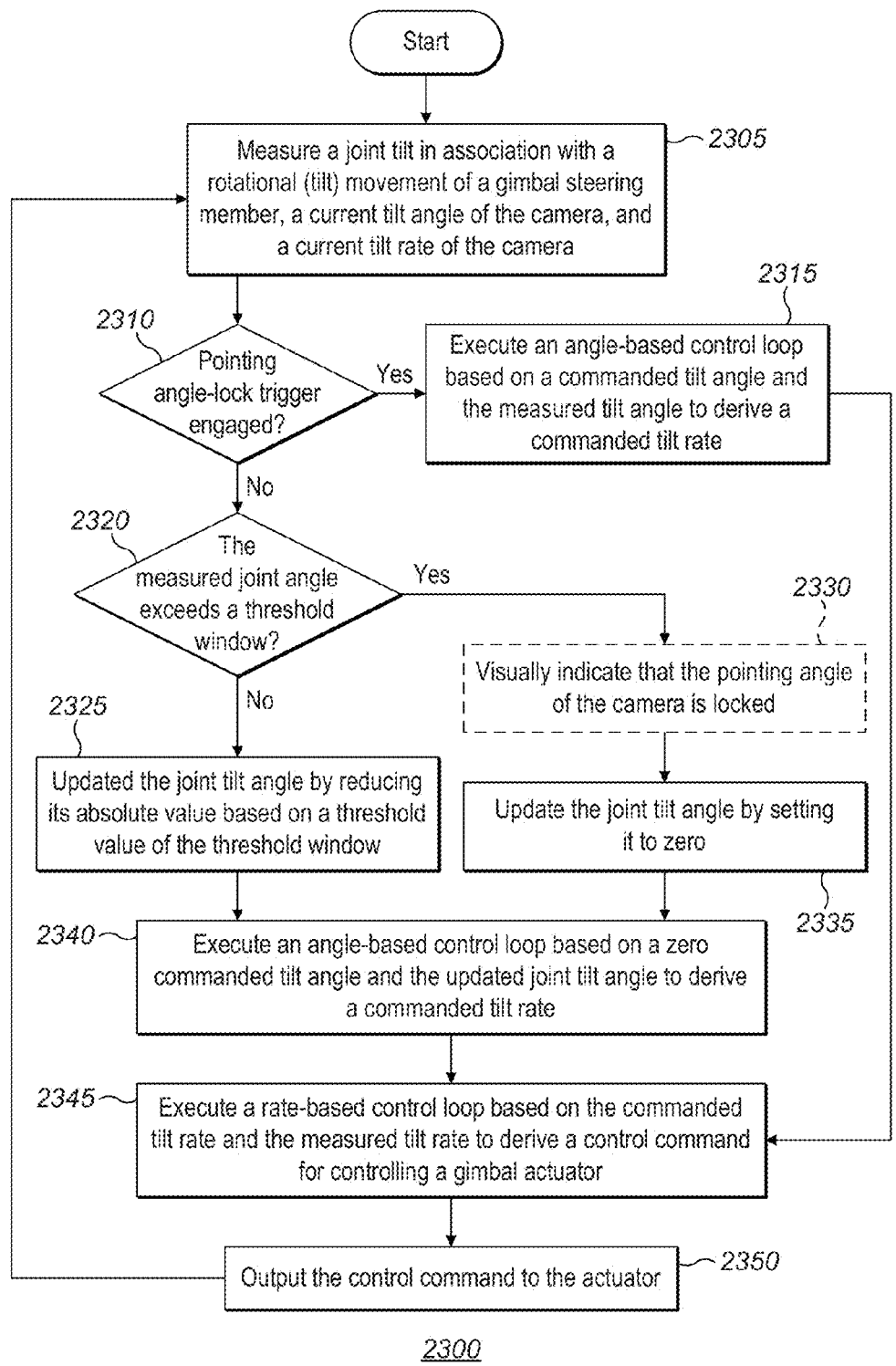
FIG. 23 is a flowchart of a method for adjusting a pointing angle of an actively stabilized camera responsive to rotational movements of a steering gimbal member and for locking the camera's pointing angle, according to some embodiments.

FIG. 23 illustrates another method for adjusting a pointing angle of an actively stabilized camera responsive to rotational movements of a steering gimbal member, such as handle(s), in accordance with some embodiments. As described, the method 2300, similar to the method 2200, does not rely on a forcing function to enable the steering mode. The method 2300, however, expands upon the method 2200 by incorporating a trigger for inhibiting the steering mode.

The method 2300 starts with step 2305 at which a joint angle in association with a rotational movement of a gimbal steering member is measured. Further, current angle and angular rate of the camera are measured as well, for example by a camera mounted IMU. At step 2310, a determination is made as to whether a pointing angle lock trigger, such as a special purpose button, actuator, or other controller, is engaged (just became engaged or continues to be engaged). As described in greater detail with respect to FIG. 20, by engaging the trigger, the camera operator inhibits the steering mode, switching to a normal stabilization mode. Further, although not shown in FIG. 23, when the trigger becomes engaged, rather than continues to be engaged, the current measurement of the camera's pointing angle is saved as a commanded angle, for example by a store and hold element. If the trigger is engaged, the method 2300 proceeds to execute an outer angle-based control loop update based on a commanded angle and the angle measured at step 2305.

When step 2315 is executed in response to the trigger becoming engaged, effectively, the commanded angle and the measured angle processed by the angle-based control loop update are the same and no steering angle adjustment will be required (the pointing angle is fully stabilized). Otherwise, the commanded angle and the measured angle may differ and slight correction adjustment of the pointing angle may be required to maintain stabilization. Such an adjustment will be derived at step 2340 by the rate-based control loop update, based on the current measured tilt rate and the commanded tilt rate derived at step 2315, issued as a control command and outputted at step 2350 to a respective actuator.

If, at step 2310, a determination is made that the pointing angle lock trigger is not engaged, or has been released, then the steering mode is active and the camera's pointing angle will be steered responsive to rotational movements of the steering member. Steps 2320, 2325, 2330, 2335, 2340, 2345, and 2350 generally replicate steps 2220, 2235, 2225, 2230, 2240, 2245, and 2250 respectively, described with respect to FIG. 22, and are performed in the same manner. That is, the method 2300 may generally be viewed as an extension of the method 2200 by incorporating the feature of inhibiting at-will the steering modem, as described in greater detail with respect to FIG. 20.

Figure 24:
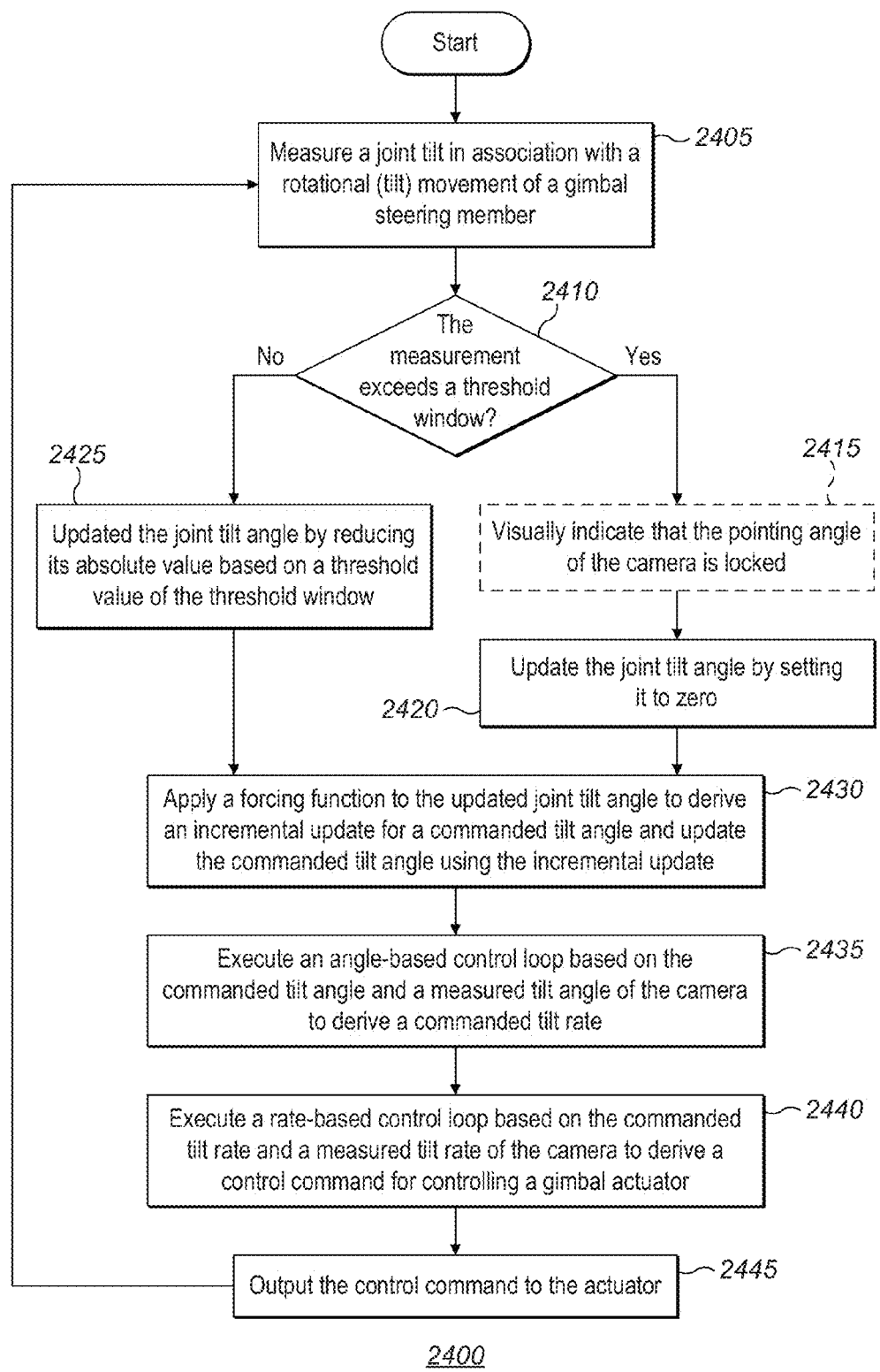
FIG. 24 is a flowchart of a method for adjusting a pointing angle of an actively stabilized camera responsive to rotational movements of a steering gimbal member using a forcing function, according to some embodiments.

FIG. 24 illustrates a method 2400 for adjusting a pointing angle of an actively stabilized camera, using a forcing function, responsive to rotational movements of a steering gimbal member, in accordance with some embodiments. The method 2400 starts with step 2405 at which a joint angle in association with a rotational movement of a gimbal steering member is measured or otherwise obtained, for example, from a resolver of the respective actuator. Further, the joint angle measurement may be inferred from a combination of the angle measurements from a camera mounted IMU and a second IMU located somewhere in the active stabilization system, e.g., on a steering member, an intermediate location on the gimbal frame, such as a roll beam, or the like. The method then proceeds to step 2410 to apply a threshold window function.

Steps 2410, 2415, 2420, and 2425 are generally similar to steps 2220, 2225, 2230, and 2235 respectively of the method 2200 and are executed in a similar manner. At step 2430 a forcing function, such as forcing functions discussed with respect to FIGS. 16 to 19, is applied to the updated joint angle to derive an incremental update for a commanded pointing angle of the camera. If the method 2400 arrives to step 2430 via step 2420 (the joint angle measurement is within the threshold window), the forcing function is effectively applied to a zero value. Consequently, the output of the forcing function is zero as well, and the commanded angle remains the same. That is, the camera's pointing angle will be maintained, corrected for disturbances within the threshold window, at steps 2435, 2440, and 2445. Effectively, since no adjustments to the commanded angle are made, a normal stabilization process, including the nested control loops, is performed.

However, if the method 2400 arrives to step 2430 via step 2425 (the joint angle measurement exceeds the threshold window), the forcing function is applied to a joint angle in the excess of the threshold window (the joint angle reduced by the threshold value) to derive an incremental update. The commanded angle is then updated using the incremental update to derive a new commanded angle. As discussed above, steps 2435, 2440, and 2445 are generally the steps that are performed to execute a normal stabilization process for maintaining the camera's pointing angle. However, because the commanded angle has been updated at step 2430, steps 2435, 2440, and 2445, provide for steering adjustment of the camera's pointing angle in the direction of the rotational movement of the steering member. Further, due to the forcing function being used to determine incremental updates to the commanded angle, as the steps 2435, 2440, and 2445 are repeated based on newly acquired measurements, these steps produce a pointing angle movement proportional to the rotational movement of the steering member, as defined by the joint angle values reduced by the threshold value.

Figure 25:
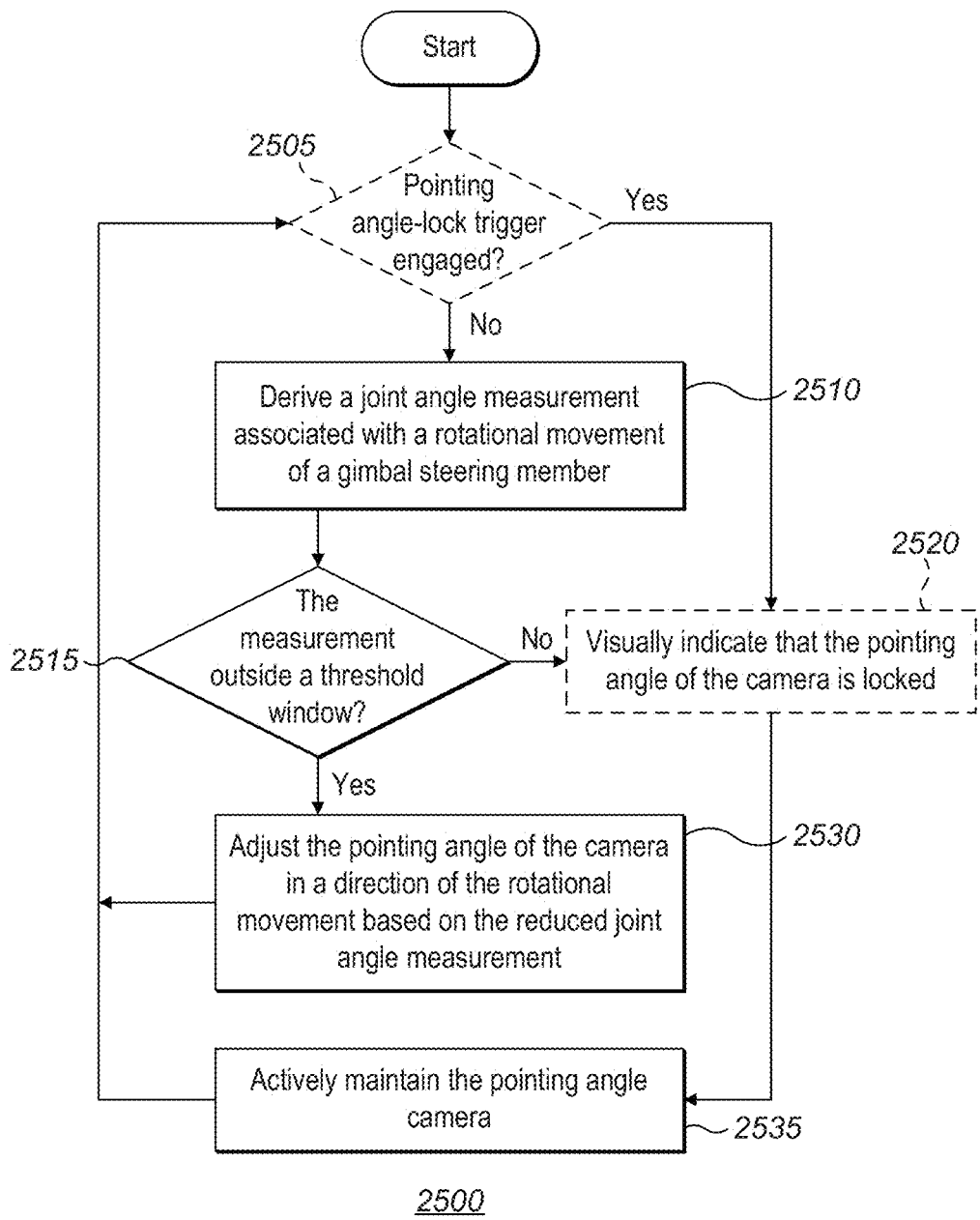
FIG. 25 is a flowchart of a method for adjusting a pointing angle of an actively stabilized camera responsive to rotational, according to some embodiments.

FIG. 25 illustrates a general method for adjusting a pointing angle of an actively stabilized camera responsive to rotational movements of a steering gimbal member, in accordance with some embodiments. The method starts with an optional step of determining if a pointing angle lock trigger is engaged. If the determination is positive, the steering mode is inhibited and the camera's pointing angle is actively stabilized in accordance with a commanded angle at step 2535, for example in the manner described with respect to FIG. 23. Also optional is a step 2520 of visually indicating that the current pointing angle of the camera is locked (described in greater detail, for example, with respect to FIG. 22).

If the pointing angle lock trigger is not engaged, a joint angle measurement, associated with a rotational movement of the gimbal steering member is derived at step 2510. As described with respect to, for example FIGS. 15, 16, and 20 to 22, depending on the current pointing angle of the steering member (or the gimbal) and/or the current pointing angle of the camera, the joint angle measurements may be derived from direct measurement of a joint angle for a corresponding axis, direct measurements of a joint angle for a different axis, a combination of joint angle measurements for different axis, and/or a combination of direct angle measurements from two different IMUs, a camera mounted IMU and a steering member (handle) mounted IMU. The derived joint angle measurement is then evaluated against a threshold window at step 2515, similar to steps 2220, 2310, and 2410 of the methods 2200, 2300, and 2400 respectively. The measurement falling within the threshold window means that the current pointing angle should be stabilized at step 2535 in accordance with the commanded pointing angle. That is, correction adjustments could be made to the pointing angle to stabilize it, if it was subject to some disturbance. The optional step 2520 of visually indicating that the current pointing angle of the camera is locked may also be performed.

If the joint angle measurement exceeds the threshold window, the method 2500 proceeds to step 2530, where the camera's pointing angle is adjusted in a direction of the rotational movement of the steering member, based on the derived joint angle measurement. Step 2530 may include any of the methodologies described above concerning the steering mode with respect to FIGS. 22 to 24. That is, step 2530 may include reducing the joint angle measurement by a value of the threshold window, applying a forcing function, executing the angle and rate-based control loops, and/or any variations of the described methods.

Each of the methods 2200, 2300, 2400, and 2500 can be performed for one or more of the tilt, pan, and roll axes in relation to the corresponding axis(es). Further, each of the methods 2200, 2300, 2400, and 2500 may be activated only for one or more of the axes. For example, by activating the method 2200, 2300, 2400, or 2500 for the pan axis only, the camera operator is able to steer the pan angle of the camera, while the remote operator remains responsible for adjusting the tilt, or vice versa.

Figure 26:
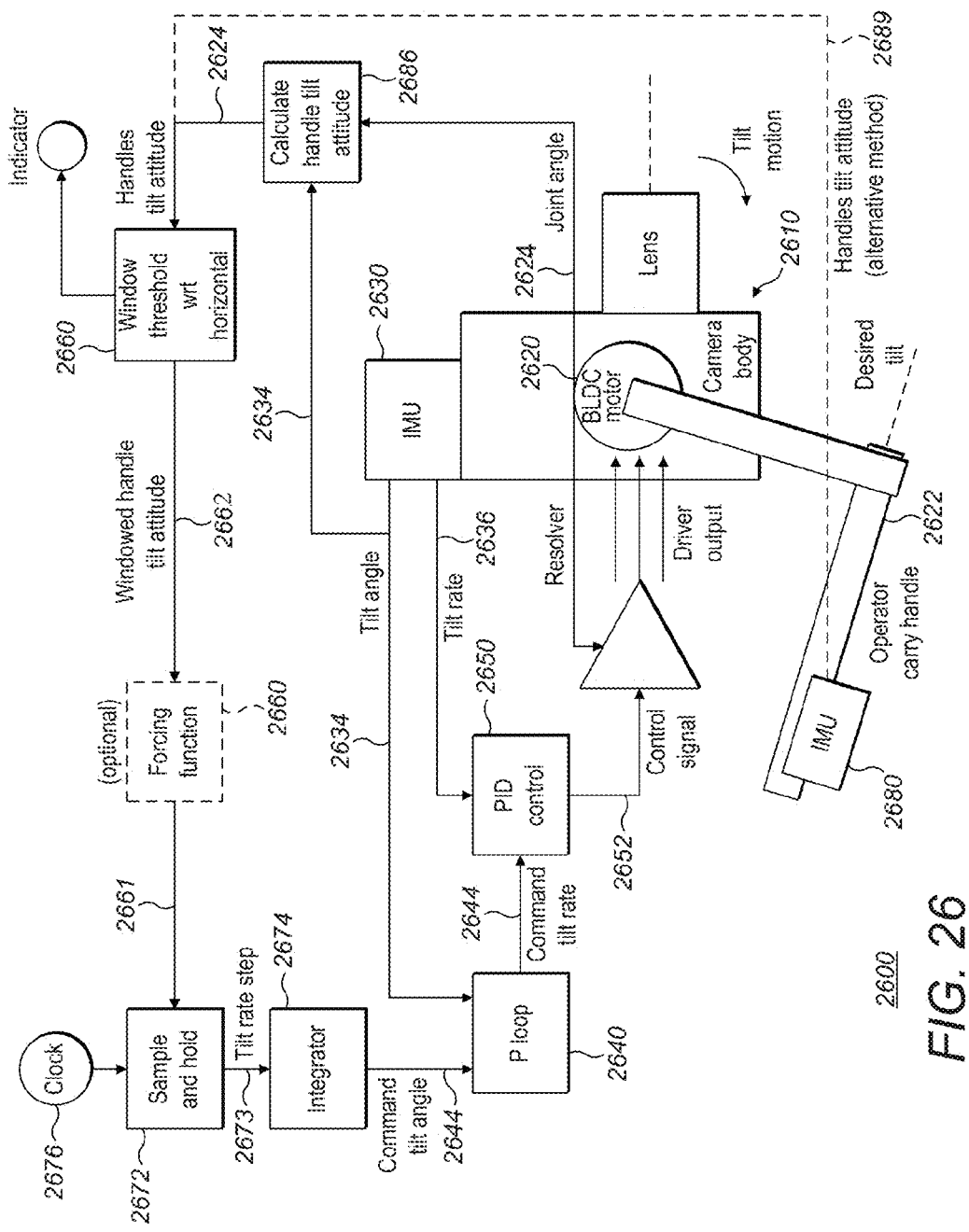
FIG. 26 is a flowchart of a single axis controller for enabling a velocity mode, according to some embodiments.

FIG. 26 illustrates a single axis controller 2600 for enabling steering of the camera responsive to a rotational movement of a steering member 2622 and in relation to positioning of the steering member (a velocity steering mode), according to some embodiments. Generally, the velocity steering mode enables the camera operator to command a motion of the camera's pointing angle by moving the steering member from the horizontal plane to start the motion, and returning the steering member to the substantially horizontal plane to stop the motion. The speed of the pointing angle motion (how fast the camera's pointing angle is changed) is determined by how far the steering member 2622 is titled from the horizontal plane. The motion is in the same direction as the rotational movement (tilting) of the steering member 2622. In some embodiments, a threshold window function 2660 is implemented in the velocity mode, similarly to the steering mode discussed herein, so as to allow the camera operator some room for error and prevent unintentional movement.

For example, if the operator tilts the gimbal handles forward, crossing the border of the threshold window, then the camera starts tilting downward at a rate proportional to the estimated (joint) angle. By bringing the handles backward and back into the threshold window, the motion of the pointing angle will be stopped. In this manner, the camera operator is able to control the pointing angle (tilt) of the camera by rotating the steering member slightly, not all the way, to start the motion, indicating the motion direction, and to stop the motion when a desired pointing angle is reached, by returning handles into the original position. The velocity steering mode may be particularly appropriate when extreme pointing angles are desired, such as above 45 degrees from the horizontal plane. In particular, the steering velocity mode improves the camera operator's convenience in controlling the pointing tilt angle of the camera, e.g., the camera operator does not have to constantly hold the handles in an upward pose. It should be noted that similar principles are applicable for the pan angle in relation to a vertical plane.

To enable the velocity steering mode, the controller 2600 implements the angle-based and rate-based control loops controlled by P and PID control elements 2640 and 2650 respectively. Both loops generally perform in the same manner as the control loops of the controller 1400, discussed above with respect to FIG. 14. However, while the command angle 1444 inputted into the P loop of the controller 1400 as a set point, the controller 2600 derives the command tilt angle 2644 from relative joint angle data.

In particular, an element 2660 sets a threshold window in relation to the horizontal plane. The element 2660 receives attitude measurements 2689 from an IMU 2680, located on the steering member 2622, and determines whether the received measurements exceed the set threshold window. When the steering member attitude 2689 exceeds the threshold, the element 2660 reduces this attitude 2689 by the absolute value of the threshold window, and provides the resulting windowed tilt attitude (angle) 2662 to a sample and hold unit 2672. The sample and hold unit 2672 determines a tilt rate step 2673 (update) for updating the camera's pointing angle, for example based on integration methods as discussed herein. In some embodiments, an optional forcing function 2668 is employed to generate the stepping rate 2673. The forcing function 2668 is generally similar to the forcing function discussed above with respect to FIGS. 16 to 19, although may differ in power. Generally, the forcing function 2668 is used to shape the pointing angle movement, making it smoother, particularly when crossing the threshold border, rather than making it abrupt.

An integrator 2674 updates the command angle, stored at the sample and hold unit 2672, by the tilt update rate, and provides the updated command tilt angle to the P loop for stabilization. As the command tilt angle has been updated, the execution of the stabilization P and PID loops will result in the pointing angle motion in the direction indicated by the rotational movement of the steering member 2622. Clock 2676 defines an update rate for sampling the windowed tilt attitude and determining the tilt rate step. Such an update rate typically corresponds to the update rate of the P and PID loops. As long as the tilt angle of the steering member 2622 exceeds the set threshold window, even though the steering member 2622 is no longer moving, the commanded angle 2644 will continue to be updated, causing the pointing angle to move.

In some embodiments, the angle (attitude) of the steering member 2622 is inferred from the IMU tilt angle 2634 and the tilt joint angle 2624, as provided by a resolver of an actuator 2620, by a subtraction.

The order of execution or performance of the operations in the embodiments illustrated and described herein is not essential, unless otherwise specified. Further, not all operations are necessarily performed. That is, the operations/steps described herein, for example, with respect to FIGS. 15, 16, and 20 to 25 may be performed in any order, unless otherwise specified, and embodiments may include additional or fewer operations/steps than those disclosed herein. For example, a particular selected order and/or number of steps of methods may depend on camera's operator preferences and/or technical specifications of the gimbal stabilization system and/or camera and/or their components. It is further contemplated that executing or performing a particular operation/step before, contemporaneously with, or after another operation is in accordance with the described embodiments.

The order of execution or performance of the operations in the embodiments illustrated and described herein is not essential, unless otherwise specified. Further, not all operations are necessarily performed. That is, the operations/steps described herein, for example, with respect to FIGS. 15, 16, and 20 to 26 may be performed in any order, unless otherwise specified, and embodiments may include additional or fewer operations/steps than those disclosed herein. For example, a particular selected order and/or number of steps of methods may depend on camera's operator preferences and/or technical specifications of the gimbal stabilization system and/or camera and/or their components. It is further contemplated that executing or performing a particular operation/step before, contemporaneously with, or after another operation is in accordance with the described embodiments.

The methods and operations described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), flash memory cards, such as a micro-SD memory card, or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

It should be further understood that multiple parameters and settings discussed herein are adjustable by the camera operator and/or remote operator, at the time the active stabilization system is initialized and/or while in use, e.g., during filming. More specifically, in some embodiments, the remote operator may set up or adjust any of the parameters and settings discussed herein, using a remote controller, a computer (or other processing device) running a set-up/adjustment application, or any other device in communication with the active stabilization system and/or camera, via a remote link, wireless, such as radio (e.g., cellular, Wi-Fi, Bluetooth) or wired (e.g., fiber optics, cabling, or the like). The set-up/adjustment application provides its user (e.g., remote operator, camera operator, or other) with a graphical interface (GUI) that enables the user to select and adjust desired parameters and/or settings for the active stabilization system and/or camera, activate or deactivate different modes supported by the active stabilization system, including for selected or all axes (pan, tilt, roll), and/or camera, and the like. Corresponding commands (data, values) are transmitted to the active stabilization system and/or camera so as to update the respective parameters and settings there. That is, the user is able to control and adjust various parameters and settings of the camera and/or active stabilization system and/or activate/deactivate different modes remotely, using a specially designed application, installed on the device or web-based. The adjustable parameters and settings include, but are not limited to, camera's settings, e.g., focal settings, such as a focal length of the lens; distances, e.g., to the filming subject, height, or the like; various thresholds, scale factors, forcing functions, control loops settings, such as PID gains, maximum and/or minimum values, filters settings and bandwidth, settings for different axes, sensors' settings, storage settings, control rates, calibrations, offsets, and the like. The application may also inform the user about the system/camera's status and voice alarms when errors are detected.

Further, while the invention has been described in terms of various specific embodiments, the skilled person would recognize that the invention can be practiced with modification within the spirit and scope of the claims.

The invention claimed is:

1. A method for adjusting a pointing angle of a camera housed by an active stabilization system configured to stabilize the camera in accordance with a commanded pointing angle, the system comprising a steering member, the steering member rotatable around one or more of a pan axis, tilt axis, or roll axis of the system, the method comprising:
deriving a joint angle measurement of the steering member associated with a rotational movement of the steering member; and
adjusting the pointing angle of the camera, based on the derived joint angle measurement, in a direction of the rotational movement of the steering member, if the joint angle measurement exceeds a threshold window.

2. A method according to claim 1, wherein the rotational movement is resolved around a vertical axis.

3. A method according to claim 1, further comprising:
actively stabilizing the pointing angle of the camera in accordance with the commanded pointing angle, if the joint angle measurement is within the threshold window.

4. A method according to claim 1, further comprising:
indicating, by the active stabilization system, that the pointing angle of the camera s in a locked state, if the joint angle measurement is within the threshold window.

5. A method according to claim 4, wherein the indicating step comprises at least one of:
visually indicating the locked state, using a visual indicator of the active stabilization system; or
generating a sound indicator to indicate the locked state.

6. A method according to claim 1, further comprising:
updating the joint angle measurement, wherein the updating step comprises:
reducing the joint angle measurement by a threshold value of the threshold window, if the joint angle measurement exceeds the threshold window, and
setting the joint angle measurement to zero, if the joint angle measurement is within the threshold window; and
deriving a control command for adjusting the pointing angle of the camera based on the updated joint angle measurement.

7. A method according to claim 6, further comprising:
applying a forcing function to the reduced joint angle measurement to derive an incremental update to the commanded pointing angle;
updating the commanded pointing angle by the incremental update; and
executing an update of a stabilization control loop based on the updated commanded angle to derive the control command for adjusting the pointing angle of the camera proportionally to the reduced joint angle measurement in the direction of the rotational movement of the steering member.

8. A method according to claim 6, further comprising:
executing an angle-based control loop to derive a commanded angle rate; and
executing an update of a stabilization control loop based on the updated joint angle measurement and a zero commanded angle to derive the control command for adjusting the pointing angle.

9. A method according to claim 7, wherein the stabilization control loop comprises:
an angle-based outer control loop for deriving a commanded rate; and
a rate-based inner control loop, based on the commanded rate and a current angle rate of the camera for deriving the control command for adjusting the pointing angle of the camera.

10. A method according to claim 1, wherein, the method further comprises:
in response to a trigger locking the pointing angle of the camera becoming engaged:
measuring a current pointing angle of the camera, and
storing the measured pointing angle of the camera as the commanded angle, and
actively stabilizing the pointing angle of the camera in accordance with the stored commanded pointing angle until the trigger becomes released.

11. A method according to claim 1, wherein the deriving a joint angle measurement step comprises:
acquiring the joint angle measurement for at least one of the pan axis, the tilt axis, or
the roll axis from a resolver of an actuator for the at least one of the pan axis, the tilt axis, or the roll axis.

12. A method according to claim 1 performed for at least one of the pan axis, the tilt axis, or the roll axis.

13. A method according to claim 12, wherein the joint angle measurement is derived based on one of:
(1) a joint angle for an axis corresponding to the at least one of the pan, tilt, or roll axes,
(2) a joint angle for an axis different from the at least one of the pan, tilt, roll axes, or
(3) two or more of joint angles for at least one of the pan, tilt, or roll axes, depending on one or more of a current pointing angle of the camera or a pointing angle of the system.

14. A method according to claim 1, further comprising:
stopping the adjusting of the pointing angle of the camera, if a new joint angle measurement is within the threshold window.

15. A method according to claim 1, wherein the deriving a joint angle measurement step comprises:
measuring a first angle by a first inertial measurement unit mounted on the camera;
measuring a second angle by a second inertial measurement unit located at an intermediate location of a gimbal frame to derive a second measurement; and
deriving the joint angle measurement based on the first and second angles.

16. A method according to claim 1, wherein the deriving a joint angle measurement step comprises:
measuring a joint angle for at least two of the pan axis, the tilt axis, or the roll axis; and
deriving the joint angle measurement based on the at least two measured joint angles.

17. A non-transitory computer-readable medium storing program instructions for causing a processor to perform a method for adjusting a pointing angle of a camera housed by an active stabilization system configured to stabilize the camera in accordance with a commanded pointing angle, the system comprising a steering member, the steering member rotatable around one or more of a pan axis, tilt axis, or roll axis of the system, the method comprising:
deriving a joint angle measurement of the steering member associated with a rotational movement of the steering member; and
adjusting the pointing angle of the camera, based on the derived joint angle measurement, in a direction of the rotational movement of the steering member, if the joint angle measurement exceeds a threshold window.

18. An active stabilization system for adjusting a pointing angle of a camera housed by the system, the system comprising:
a steering member rotatable around one or more of a pan axis, tilt axis, or roll axis of the active stabilization system and in relation to the camera;
an inertial measurement unit configured to measure the pointing angle of the camera and an angular rate of the camera, the inertial measurement unit mounted on the camera; and
an active stabilization controller configured to:
stabilize the pointing angle of the camera in accordance with a commanded pointing angle, using measurements of the inertial measurement unit;
derive a joint angle measurement of the steering member associated with a rotational movement of the steering member; and
adjust the pointing angle of the camera, based on the derived joint angle measurement, in a direction of the rotational movement of the steering member, if the joint angle measurement exceeds a threshold window.

19. An active stabilization system according to claim 18, further comprising:
a second inertial measurement unit mounted on a frame of the system and configured to measure a pointing angle of the steering member, wherein
the active stabilization controller configured to derive the joint angle measurement of the steering member using the measurements provided by the camera mounted inertial measurement unit and the second inertial measurement unit.

20. An active stabilization system according to claim 18, wherein the rotational movement is resolved around one of a vertical axis, a horizontal axis, or a forwards axis.

21. An active stabilization system according to claim 18, wherein the active stabilization controller is configured to stabilize the pointing angle of the camera in accordance with the commanded pointing angle if the joint angle measurement is within the threshold window.

22. An active stabilization system according to claim 18, further comprising an indicator for indicating that the pointing angle of the camera is in a locked state if the joint angle measurement is within the threshold window.

23. A method according to claim 1, wherein the pointing angle of the camera is adjusted based on the derived joint angle measurement, in a direction of the rotational movement of the steering member, while the active stabilization system is in a steering mode, the method further comprising:
inhibiting the steering mode in response to a trigger for locking the pointing angle of the camera becoming engaged.

24. A method according to claim 1, wherein the rotational movement is resolved around one of a horizontal axis or a forwards axis.

25. A method according to claim 1, wherein the active stabilization system is a hand-held gimbal.

26. A method according to claim 1, wherein the joint angle measurement exceeds the threshold window if an absolute value of the joint angle measurement is greater than a pre-set threshold value defining the threshold window.

27. A method according to claim 26, wherein the pre-set threshold value is adjustable.

28. A method according to claim 1, wherein the steering member comprises at least one of: one or more gimbal steering handles, a gimbal support base, or a mounting member for mounting a gimbal on to a movable object.

29. A method according to claim 1, wherein the pointing angle of the camera is adjusted in the direction of the rotational movement of the steering member to gradually steer a pointing direction of the camera to follow the rotational movement of the steering member.

30. A method according to claim 29, wherein a change rate of the pointing direction of the camera is controllable by a rate of the rotational movement of the steering member.

31. An active stabilization system according to claim 22, wherein the indicator is at least one of a visual indicator or a sound indicator.

32. An active stabilization system according to claim 18, wherein the active stabilization controller is further configured to:
update the joint angle measurement by reducing the joint angle measurement by a threshold value of the threshold window, if the joint angle measurement exceeds the threshold window, and setting the joint angle measurement to zero, if the joint angle measurement is within the threshold window; and
derive a control command for adjusting the pointing angle of the camera based on the updated joint angle measurement.

33. An active stabilization system according to claim 32, wherein the active stabilization controller is further configured to:
apply a forcing function to the reduced joint angle measurement to derive an incremental update to the commanded pointing angle;
update the commanded pointing angle by the incremental update; and
execute an update of a stabilization control loop based on the updated commanded angle to derive the control command for adjusting the pointing angle of the camera proportionally to the reduced joint angle measurement, in the direction of the rotational movement of the steering member.

34. An active stabilization system according to claim 33, wherein the stabilization control loop comprises:
an angle-based outer control loop for deriving a commanded rate; and
a rate-based inner control loop, based on the commanded rate and a current angle rate of the camera, for deriving the control command for adjusting the pointing angle of the camera.

35. An active stabilization system according to claim 32, wherein the active stabilization controller is further configured to:
execute an angle-based control loop to derive a commanded angle rate; and
execute an update of a stabilization control loop based on the updated joint angle measurement and a zero commanded angle to derive the control command for adjusting the pointing angle.

36. An active stabilization system according to claim 18, wherein the active stabilization controller is configured to adjust the pointing angle of the camera in the direction of the rotational movement of the steering member while the active stabilization system is in a steering mode and to stabilize the pointing angle of the camera in accordance with the commanded pointing angle when the steering mode is inhibited.

37. An active stabilization system according to claim 36, further comprising:
a trigger for inhibiting the steering mode to lock the pointing angle of the camera, wherein the active stabilization controller is configured, in response to the trigger becoming engaged, to determine a current pointing angle of the camera and set the current pointing angle of the camera as the commanded angle.

38. An active stabilization system according to claim 19, further comprising: at least one actuator for rotating a support structure of the active stabilization system about at least one of the pan axis, the tilt axis, or the roll axis, the at least one actuator comprising a resolver configured to provide the joint angle measurement for the at least one of the pan axis, the tilt axis, or the roll axis.

39. An active stabilization system according to claim 18, wherein the active stabilization controller is configured to adjust the pointing angle of the camera in the direction of the rotational movement of the steering member for at least one of the pan axis, the tilt axis, or the roll axis.

40. An active stabilization system according to claim 39, wherein the joint angle measurement is derived based on one of:
(1) a joint angle between the steering member and the camera for an axis corresponding to the at least one of the pan, tilt, or roll axes,
(2) a joint angle between the steering member and the camera for an axis different from the at least one of the pan, tilt, or roll axes, or
(3) two or more of joint angles between the steering member and the camera for at least one of the pan, tilt, or roll axes, depending on one or more of a current pointing angle of the camera or a pointing angle of the system.

41. An active stabilization system according to claim 18, wherein the active stabilization system is a hand-held gimbal.

42. An active stabilization system according to claim 18, wherein the steering member is one or more gimbal steering handles; a gimbal support base; or a mounting member for mounting the active stabilization system onto a movable object.

43. An active stabilization system according to claim 18, wherein the active stabilization controller is configured to adjust the pointing angle of the camera in the direction of the rotational movement of the steering member to gradually steer a pointing direction of the camera to follow the rotational movement of the steering member.

* * * * *

UNITED STATES PATENT AND TRADEMARK OFFICE
CERTIFICATE OF CORRECTION

PATENT NO. : 8,938,161 B2  
APPLICATION NO. : 14/214471  
DATED : January 20, 2015  
INVENTOR(S) : Steve Webb et al.

It is certified that error appears in the above-identified patent and that said Letters Patent is hereby corrected as shown below:

In the Claims

• Column 33, line 28, Claim 4, "camera s in a locked state" should read --camera is in a locked state--.

• Column 37, line 5, Claim 38, "claim 19" should read --claim 18--.

Signed and Sealed this  
Fifteenth Day of December, 2015

Michelle K. Lee  
*Director of the United States Patent and Trademark Office*